(12) United States Patent
Workman, II et al.

(10) Patent No.: US 7,238,386 B2
(45) Date of Patent: Jul. 3, 2007

(54) METHODS FOR MAKING AND USING POINT LUMP-FREE COMPOSITIONS AND PRODUCTS COATED WITH POINT LUMP-FREE COMPOSITIONS

(75) Inventors: Gregory Lee Workman, II, West Chester, OH (US); Don Leon King, Burlington, KY (US); Camille Jeanette Rechel, Cincinnati, OH (US); Timothy Edward Myers, Mason, OH (US)

(73) Assignee: Hexion Specialty Chemicals, Inc., Columbus, OH (US)

( * ) Notice: Subject to any disclaimer, the term of this patent is extended or adjusted under 35 U.S.C. 154(b) by 654 days.

(21) Appl. No.: 10/420,910

(22) Filed: Apr. 23, 2003

(65) Prior Publication Data

US 2003/0211236 A1    Nov. 13, 2003

Related U.S. Application Data

(60) Provisional application No. 60/378,663, filed on May 9, 2002.

(51) Int. Cl.
*B05D 5/06* (2006.01)
(52) U.S. Cl. .................................. 427/162; 427/163.3
(58) Field of Classification Search ................ 427/162, 427/163.3
See application file for complete search history.

(56) References Cited

U.S. PATENT DOCUMENTS

| | | | |
|---|---|---|---|
| 4,132,641 A | 1/1979 | Elsworth | |
| 4,294,740 A | 10/1981 | Mizuguchi et al. | ........ 260/29.6 |
| 4,474,830 A | 10/1984 | Taylor | |
| 4,512,944 A | 4/1985 | Astfalk et al. | |
| 4,913,859 A | 4/1990 | Overton et al. | |
| 4,962,992 A | 10/1990 | Chapin et al. | |
| 4,985,284 A | 1/1991 | Shibata et al. | |
| 5,146,531 A | 9/1992 | Shustack | |
| 5,275,743 A | 1/1994 | Miller et al. | |
| 5,279,731 A | 1/1994 | Cook et al. | |
| 5,348,660 A | 9/1994 | Fujikata | |
| 5,352,712 A | 10/1994 | Shustack | |
| 5,468,382 A | 11/1995 | Cook et al. | |
| 5,469,252 A | 11/1995 | Doles et al. ................ 356/73.1 | |

(Continued)

FOREIGN PATENT DOCUMENTS

JP    357124307    8/1982

(Continued)

*Primary Examiner*—Alain L. Bashore

(57) ABSTRACT

A method is provided to manufacture a coated substrate, such as an optical fiber, without undesirable point lumps. The method filters a coating composition while controlling the filtering temperature, pressure drop across a filtering assembly, and filter pore size to achieve a resulting filtration factor not greater than 250,000 $s^{-1}$. The filtration factor is a function of filtering temperature and pressure drop across the filtering assembly. Typically, the coating composition is filtered by passing the coating composition through one or more filters of the filtering assembly, having an absolute pore size rating in the range from approximately 0.05 to approximately 5 microns, at a temperature less than approximately 105° F. (40° C.), and at a pressure drop $\Delta P$ across the filtering assembly of at most approximately 80 psig, wherein the ratio of pressure drop (mPa) to viscosity (mPa·s), which is dependent upon filtering temperature, minimizes the filtration factor to $\leq 250,000$ $s^{-1}$.

30 Claims, 13 Drawing Sheets

U.S. PATENT DOCUMENTS

| | | |
|---|---|---|
| 5,527,835 A | 6/1996 | Shustack |
| 5,538,791 A | 7/1996 | Shustack |
| 5,587,403 A | 12/1996 | Shustack |
| 5,639,846 A | 6/1997 | Shustack |
| 5,846,421 A | 12/1998 | Ohtani |
| 6,014,488 A | 1/2000 | Shustack |
| 6,048,911 A | 4/2000 | Shustack et al. |
| 6,056,998 A | 5/2000 | Fujimoto |

FOREIGN PATENT DOCUMENTS

| | | |
|---|---|---|
| JP | 408026778 | 1/1996 |
| JP | 411076721 | 3/1999 |

Maximum Pressure Drop versus Temperature

METHODS FOR MAKING AND USING POINT LUMP-FREE COMPOSITIONS AND PRODUCTS COATED WITH POINT LUMP-FREE COMPOSITIONS

This application claims priority from U.S. Provisional Application No. 60/378,663, having a filing date of May 9, 2002, hereby incorporated by reference in its entirety

I. BACKGROUND OF THE INVENTION

A. Field of the Inventions

The present invention relates to the art of coatings for products requiring a substantially clear surface. Specifically, the invention is a solution to the problem of point lumps in the coatings of, for example, optical fibers, by regulating the filtering conditions, such as pore size, pressure drop and temperature during filtering of the coating.

B. Background Discussion

Optical fibers for light transmission as drawn are exceptionally strong and have very few intrinsic defects. However, even a small surface flaw can render such a fiber brittle and easily broken. Thus, such fibers are generally coated by a primary and optionally a secondary coating for protection as disclosed by U.S. Pat. Nos. 6,014,488, 5,352,712, 5,527,835, 5,538,791, 5,587,403 and 6,048,911 to Shustack, each of which is incorporated herein by reference in its entirety.

In the manufacture of optical fiber cable, a glass preform rod, generally manufactured in a separate process, is suspended vertically and moved into a furnace at a controlled rate. The preform softens in the furnace and an optical fiber is drawn freely from the molten end of the preform rod by a capstan located at the base of a draw tower.

In order to protect the drawn optical fiber from damage caused by abrasion or handling, the fibers are traditionally protected by a coating. The coating is applied before the drawn fiber reaches any rolling machine or capstan to limit any defects which may result during rolling thereof.

Other than merely protecting the surface of the optical fiber from abrasion, the structure of the coating is selected to limit transmission defects. Specifically, as described in U.S. Pat. No. 4,962,992 to Chapin et al., herein incorporated by reference in its entirety, sub-standard coatings can result in large bubbles, voids, non-concentric coatings and microbending, each of which will often cause transmission errors.

Dual coated optical fibers typically are used in cables to obtain design flexibility and improved performance, while protecting against the aforementioned undesired effects. Typically, a dual coated optical fiber includes a coating system having an inner or primary coating layer characterized by a relatively low modulus rubbery material applied to the optical fiber. The modulus of the primary coating should be effective in reducing the stress transmitted to the glass by an external lateral force, thus reducing microbending of the glass. Primary coating materials have been characterized by an equilibrium modulus of elasticity in the range of about 50 psi to 200 psi. Equilibrium modulus may be defined as the final modulus that a cross-linked material will reach in time or at high temperatures. This modulus is chosen so that the primary coating achieves its principal purpose, i.e., the attenuation and uniform distribution of stress supplied to the fiber. Through this attenuation and distribution, losses due to microbending are substantially reduced. The purpose of the primary coating is to allow for a limited degree of bending without creating microbending attenuation errors.

Although the coatings do not play a direct role in the signal transmission through the glass fiber, the coatings are critical to the fiber performance. The coatings are used to provide (1) strength retention; (2) environmental protection; (3) microbending loss resistance; as well as (4) assist in fiber identity and (5) space individual fibers when bundled into cable structures.

The primary coating is usually soft or rubbery. Because the primary coating has a low glass transition temperature after curing (e.g., −20° C. to −50° C.), it has a low modulus and functions as a shock absorber. The primary coatings also generally have excellent adhesion to glass under a variety of environments and operating conditions, while being low enough to permit easy coating strippability, while resisting delamination. Such strippability is described in U.S. Pat. No. 6,014,488 to Shustack, herein incorporated by reference in its entirety.

An outer or secondary coating layer is applied over the primary layer. The secondary coating is usually of a higher modulus material to provide abrasion resistance and low friction for the coated fiber. The dual coating materials serve to cushion the optical fiber by way of the primary layer and to distribute the imposed force by way of the secondary layer, so as to isolate the optical fiber from bending moments.

The secondary coating is generally a hard, scratch resistant coating which may have a glass transition temperature as high as or greater than approximately 80° C. The secondary coating is particularly selected to exhibit high modulus and low elongation and to provide environmental protection against, for example, harsh mechanical and chemical conditions. The coefficient of friction cannot be too low (slippage of the fiber) or too high (tackiness or stickiness). It is also desirable to maintain a suitable cure degree range to limit slippage and tackiness of the coating.

Generally, the primary and secondary coatings are cured (crosslinked) by ultraviolet light. However, other curing techniques include electron beam, or electromagnetic radiation, including heat and visible light.

Typical coated optical fibers have a total diameter of approximately 245 microns. The drawn glass fiber core typically has a diameter of approximately 8 microns, with a concentric cladding of approximately 117 microns. The primary coating typically has a thickness of approximately 65 microns, with the outer coating of 55 microns forming the balance of the thickness of the coated fiber.

The innermost structure or glass fiber is designed to carry the signal from station to station. Typically, a germanium and/or erbium doped glass core is surrounded by a cladding derived from pure glass. The refractive index of the glass core is greater than that of the cladding. This ensures converging of signals as well as confining the light beam to the center of the core.

The ultraviolet-curable optical fiber coatings generally include an oligomer, a monomer, a photoinitiator and additives. Typical oligomers, monomers, photonitiators and additives are disclosed by U.S. Pat. Nos. 6,014,488 and 5,352,712 to Shustack, each of which is incorporated herein by reference. The oligomer has a high viscosity and provides the basic properties of the coating, while the lower viscosity monomer helps to adjust the crosslink density or assist in adjusting viscosity. The photoinitiator is used to start the curing reaction, and the additives are included to modify properties such as adhesion (e.g., silicone coupling agents), storage stability (e.g., shelf file) and coefficient of friction.

The glass portion of the optical fiber is conventionally manufactured via a draw tower. A consolidated blank or preform is lowered into a furnace set between 1900° C. and 2300° C., and a high precision computer controlled track is used to draw the fiber from the molten glass preform. The bare glass fiber cools down to 50° C.-60° C. as it traverses down the tower. The coating is applied to the bare fiber as it is drawn at around 35° C. to 40° C. for draw speeds over 800 meters/minute. For higher speeds, further adjustments may be needed, depending upon viscosity of the coating.

The coatings may be applied in a traditional wet-on-dry process or a modern wet-on-wet process. In the wet-on-dry process, uncured primary coating is applied to the bare fiber. Then the primary coating is at least partially cured via a set of UV lamps. Once this curing occurs, the secondary coating is applied and cured by its own set of UV lamps. The secondary coating is applied, in a "wet" state, onto the "dry" primary coating.

An alternative to the wet-on-dry process is a wet-on-wet coating process. In the wet-on-wet process, the primary coating is applied before the secondary coating. However, the primary coating is not cured until after the secondary coating is applied. Thus, both coatings are cured simultaneously. The particular design of a coating apparatus used in wet-on-wet coating is described in U.S. Pat. No. 4,474,830 to Taylor, herein incorporated by reference in its entirety. Because only a single set of UV lamps is required in a wet-on-wet application system, a smaller tower can be used and run at a faster rate than that of the wet-on-dry process.

Conventionally, the coating compositions are filtered prior to application to the glass fiber. For example, nylon filters with pore sizes of 0.1-5.0 microns are used, in a filtering process run at approximately 105° F. (40° C.) and with a pressure drop ($\Delta P$) of approximately 40 psig (275 kPa) to approximately 60 psig (415 kPa).

However, coated optical fibers have been known to have imperfect coatings, even with this filtering step. Generally, imperfections in the coatings may result from process defects (i.e., the process used to coat the glass fibers) or composition defects (i.e., the materials and compositions forming the coatings). Process defects include, for example, concentricity, while composition defects include, for example, fibrous inclusions or other contaminants. Additionally, defects, such as bubbles or delamination, may be a process defect, a composition defect or combination thereof.

One type of composition defect is a point lump. The nature of point lumps has previously been unknown. However, the present inventors believe point lumps to be caused by high molecular weight fractions of gel-like formations in the secondary coating (hereafter referred to as "gels" or "gel formations").

Point lumps may lead to (1) a coated fiber exhibiting a low tensile strength, due mainly to mechanical obstruction in post draw processing (e.g., color inking), or (2) a defect on the coating which can lead to microbending and attenuation. These gel formations may be visually perceptible or may require magnification. Most often however, the point lumps cause a shift of 5 microns (or approximately 2% of the overall diameter) in the diameter of the entire fiber structure. Additionally, while the presence of point lumps may not reduce the tensile strength of the coated fiber, the point lumps may get caught in a post-process coloring die step.

Often the point lumps have the same refractive index as the cured coating. Thus, they appear to be made of the same materials even though they are different. FIG. 1 shows an optical fiber 110 without any point lumps. It has a glass fiber 112, a primary coating 114 and a secondary coating 116. One type of point lump, an external point lump, causes a change in the total diameter of the coated fiber. External point lumps 128, indicated in FIG. 2, are generally visible because even if the refractive index of the lump is the same as the coating, at least the "bulge" is observable. FIG. 2 shows a portion of an optical fiber 120 having a glass fiber 122, a primary coating 124, a secondary coating 126 and an external point lump 128. FIG. 3 shows a portion of a optical fiber 130 having a glass fiber 132, a primary coating 134, a secondary coating 136, and an internal point lump 138. Internal point lumps often are not visible to the naked eye. Internal point lumps generally cause compression of the primary coating such that the total diameter of the coated fiber does not change, only the relative diameters of the individual components is altered.

The presence of point lumps is a problem. Due to the competitive nature of the optical fiber industry, it is not economical for optical fiber producers to "scrap" or discard product containing such imperfections. When optical fiber technology was in its earlier stages, and costs of producing coated optical fiber were much greater than today, the cost of scrap was less of an issue. Compounding the problem is the fact that the point lumps are not detectable until after the coatings have been applied to the glass fiber.

Adding to the difficulties encountered in preventing the inclusion of point lumps, is the testing therefore. Unfortunately, the only known way to test for point lumps is to draw fiber from a preform and coat the drawn fiber. Only after the coatings are applied to the glass fiber, can the presence of point lumps be detected. Even then, no known automatic testing device has been developed for isolating point lumps. Devices, however, do exist to determine a total number of defects present, as long as certain conditions are met, but the results do not specifically determine the number of point lumps present. Therefore, the only known method for determining the number of point lumps in a coated optical fiber is to manually and microscopically scan the surface thereof and count. Thus, the testing process is time consuming and expensive.

It is conventionally known to filter uncured secondary coating material at the coating manufacturing plant. However, this was done at high pressures to speed production and to remove microscopic, yet visible, particulates. This filtering is not performed to remove any invisible gels, believed to be the source of the point lumps.

Additionally, the same types of problems, i.e., the inclusion of point lumps, have been known to cause the same unwanted point lumps in other products requiring a coating, such as compact disks, dental compositions and laminated surfaces.

Therefore, there exists a need in the art to provide a method to economically produce an optical coating with little or no point lump defects resulting from the elimination of gels or gel formations in the coatings prior to application on to the bare fiber.

II. SUMMARY OF THE INVENTION

Based on the discovery of the nature of point lumps in coatings made from liquid material (as opposed to gas or solid coating materials), the present inventors sought to solve the problem of point lumps by eliminating them.

Thus, as used throughout the specification and the claims, a "point lump" is a body of a material in a coating which differs from the material of the coating. The point lump may be visible (to the naked eye), visible through magnification, or invisible if it has the same refractive index as the secondary coating. Point lumps lead to one ore more of the following: (1) low tensile strength in the coated fiber; (2)

microbending or attenuation, due to defects on the coating; and (3) visible (by the naked eye or through magnification) perturbations in the diameter of the coated fiber.

In order to prevent or minimize the occurrence of point lumps on coatings of optical fibers, specific conditions for filtering the coating compositions are selected.

In particular, it has been discovered that with proper selection of pressure drop (ΔP) across at least one filter medium of a filtering device, temperature of filtering of uncured coating material, and pore size of the filter, the occurrence of point lumps can be minimized if not eliminated. These factors are particularly selected such that a filtration factor, determined by the ΔP and filtering temperature is less than or equal to 250,000 s$^{-1}$ for at least one filter medium of a filtering device. The process is effective when used for filtering the material to be used to coat a substrate, for example material to be used as a secondary coating of an optical fiber, material to coat optical media, for example compact disks or DVDs, dental appliances, or laminated surfaces. In the present specification, the filtration factor (γ) for each of the filter media of the filtering device is defined by the following general formula:

$$\frac{\Delta P(mPa)}{\eta\,(mPa \cdot s)} = \gamma(s^{-1}) \qquad (I)$$

wherein ΔP is the pressure drop across a respective filter media of the filtering device, and η is viscosity of the coating composition within the respective filter media of the filtering device.

The process may be employed to filter a composition for use as a secondary coating in a wet on wet fiber optic coating process or a wet on dry fiber optic coating process. Preferably, the process may be employed to filter a composition for use as a secondary coating in a wet on wet fiber optic coating process. The present invention selects appropriate temperature, pressure drop and filter pore size to eliminate the gel particles that can cause point lumps.

In particular, the coating composition is passed through a filter having a pore size in the range from approximately 0.05 microns to approximately 5 microns, at a temperature less than approximately 105° F. (40° C.), and at a pressure drop ΔP across the single filter or multiple filters of approximately 0 psig to approximately 60 psig, e.g. approximately 0 to approximately 5 psig, wherein the ratio of pressure drop (mPa) to viscosity (mPa·s) minimizes the filtration factor to ≦250,000 s$^{-1}$ using a filter having a pore size in the range from 0.05 to 5 microns. It should be noted that the natural log of viscosity has been shown to be directly proportional to temperature.

Thus, by filtering the coating compositions in accordance with the invention, point lumps, i.e., visible perturbations in the thickness of the primary or secondary coating, or any non-visible deformation resulting in microbending, attenuation or in a decrease in fiber strength can be eliminated.

Additional objects, features and advantages of the present invention will become more fully apparent from the following detailed description of preferred embodiments, when taken in conjunction with the drawings wherein like reference numerals refer to corresponding parts in the several views.

III. BRIEF DESCRIPTION OF THE DRAWINGS

IV. DETAILED DESCRIPTION OF THE PREFERRED EMBODIMENTS

A. Point Lumps

Figure 1:
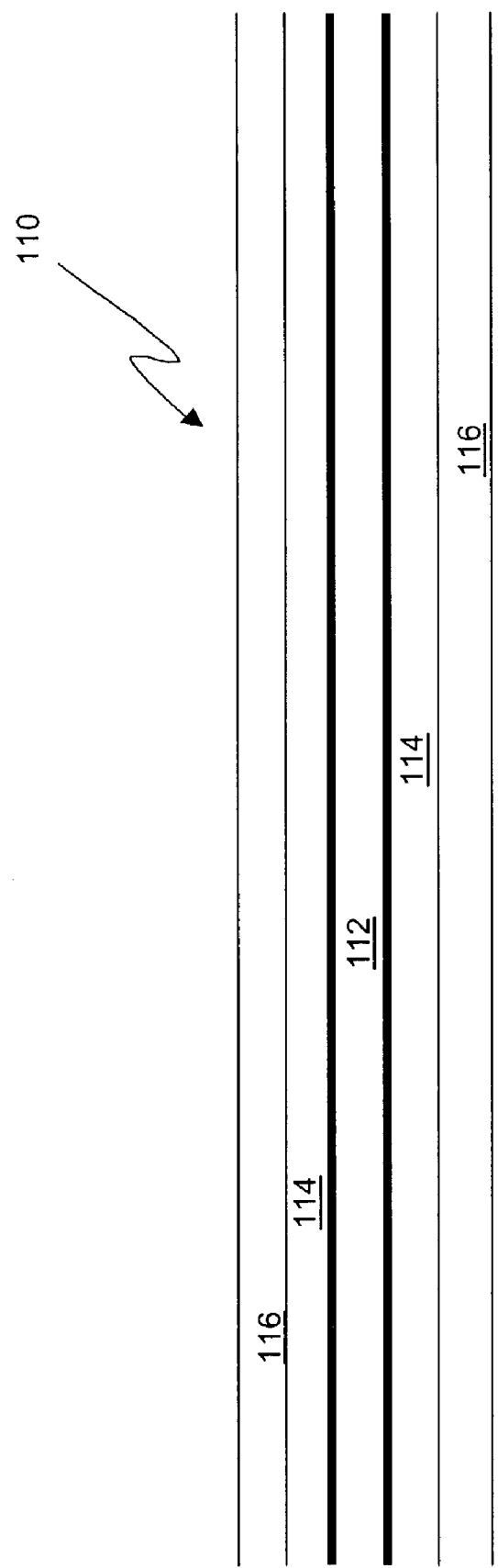
FIG. 1 is a view along the longitudinal axis of a coated optical fiber without point lumps.

FIG. 1 shows an optical fiber 110 without any point lumps. In the center of optical fiber 110 is a glass fiber 112, surrounded by a primary coating 114 and a secondary coating 116.

Figure 2:
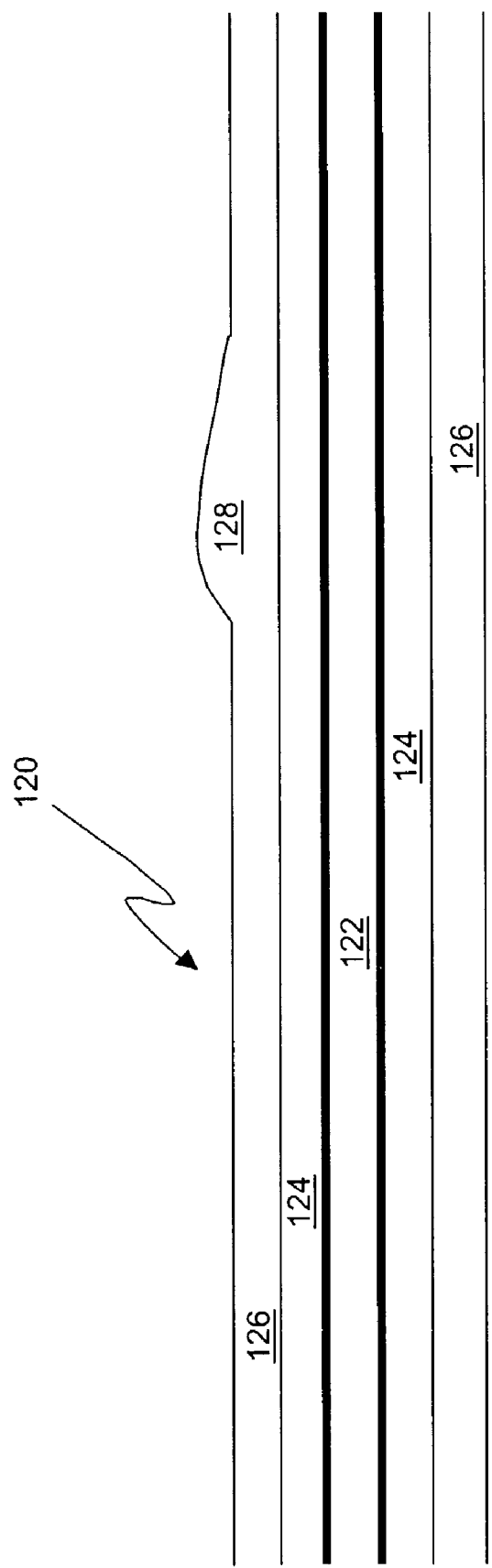
FIG. 2 is a view along the longitudinal axis of a coated optical fiber having an external point lump.

With reference to FIG. 2, a point lump 128 is shown as a perturbation in or on secondary coating 126. Essentially, point lump 128 is a defect in coatings as applied to the surface of a glass fiber 122, resulting in dislocations in a surface of secondary coating 126. The dislocations resulting from the presence of point lump 128 result in a displacement of the surface of secondary coating 126 approximately 5 microns, as compared to the locations where there is no point lump 128.

Figure 3:
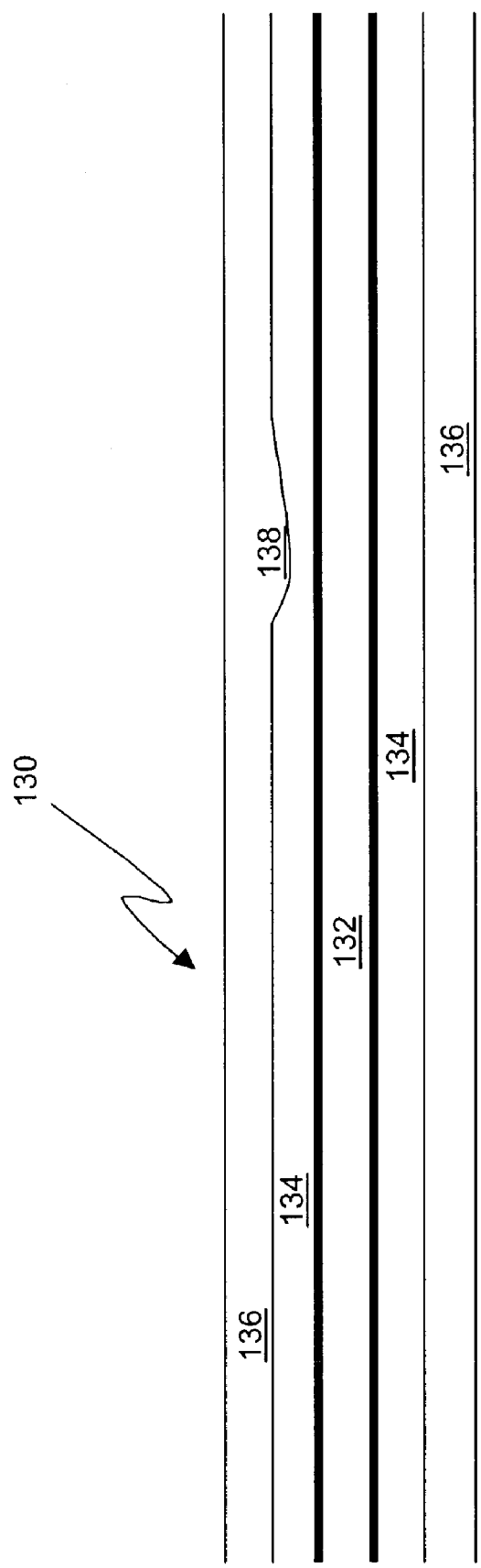
FIG. 3 is a view along the longitudinal axis of a coated optical fiber having an internal point lump.
Figure 4:
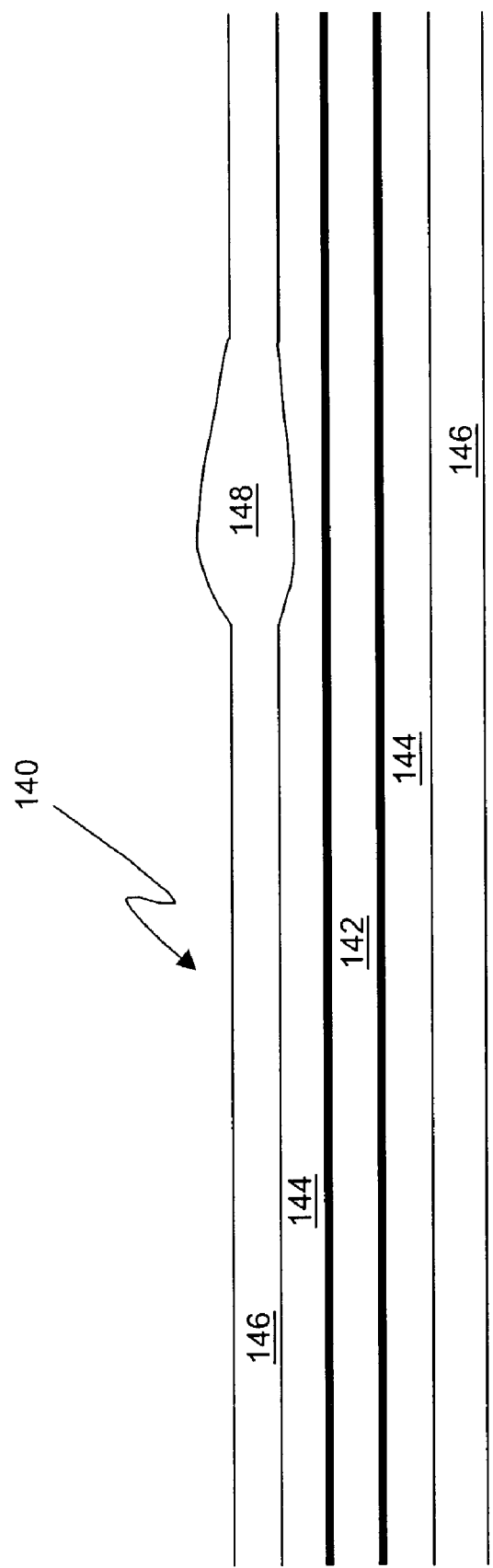
FIG. 4 is a view along the longitudinal axis of a coated optical fiber having a point lump exhibiting internal and external features.

As shown in FIG. 2, external perturbations resulting from external point lump 128 are caused by dislocation of secondary coating 126 extending away from primary coating 124 and glass fiber 122. FIG. 3 indicates an internal point lump 138, resulting from a dislocation of a secondary coating 136 extending toward a primary coating 134 and glass fiber 132. Although not drawn to scale, the total displacement of any membrane or transition having point lumps 128, 138 is approximately 5 microns from that of a fiber having no point lumps. In some cases, point lumps 128, 138 may be even smaller, resulting in displacement of approximately 3 microns. In still further cases, displacement has been measured at approximately 2% of the total cross-section of the fiber. Of course, a single point lump 148 may simultaneously provide an internal and an effect (FIG. 4).

When internal point lump 138 is present, it may not be detectable from the surface of optical fiber 130. The perturbations of internal point lump 138 extend inward and will force primary coating 134 out of its original location. Because of the flexibly of the composition of primary coating 134, upon being forced out of location, it simply compresses to make room. When internal point lump 138 is present, the transition between primary coating 134 and secondary coating 136 is displaced, for example, approximately 5 microns, but this displacement may only be visible due to light refraction or otherwise not visible from the surface of optical fiber 130. However, such a characteristic can often be viewed with a scanning electron microscope or possibly a normal stereo microscope, with a magnification of approximately 200×.

The method of the invention is particularly designed to eliminate the occurrence of point lumps 128, 138, 148 (FIGS. 2, 3, 4) in optical fibers 120, 130, 140. The presence of point lumps 128, 138, 148 may lead to low tensile strength, attenuation signal losses or simply a marred surface on the coated optical fiber.

B. Method of Making an Optical Fiber

Figure 5:
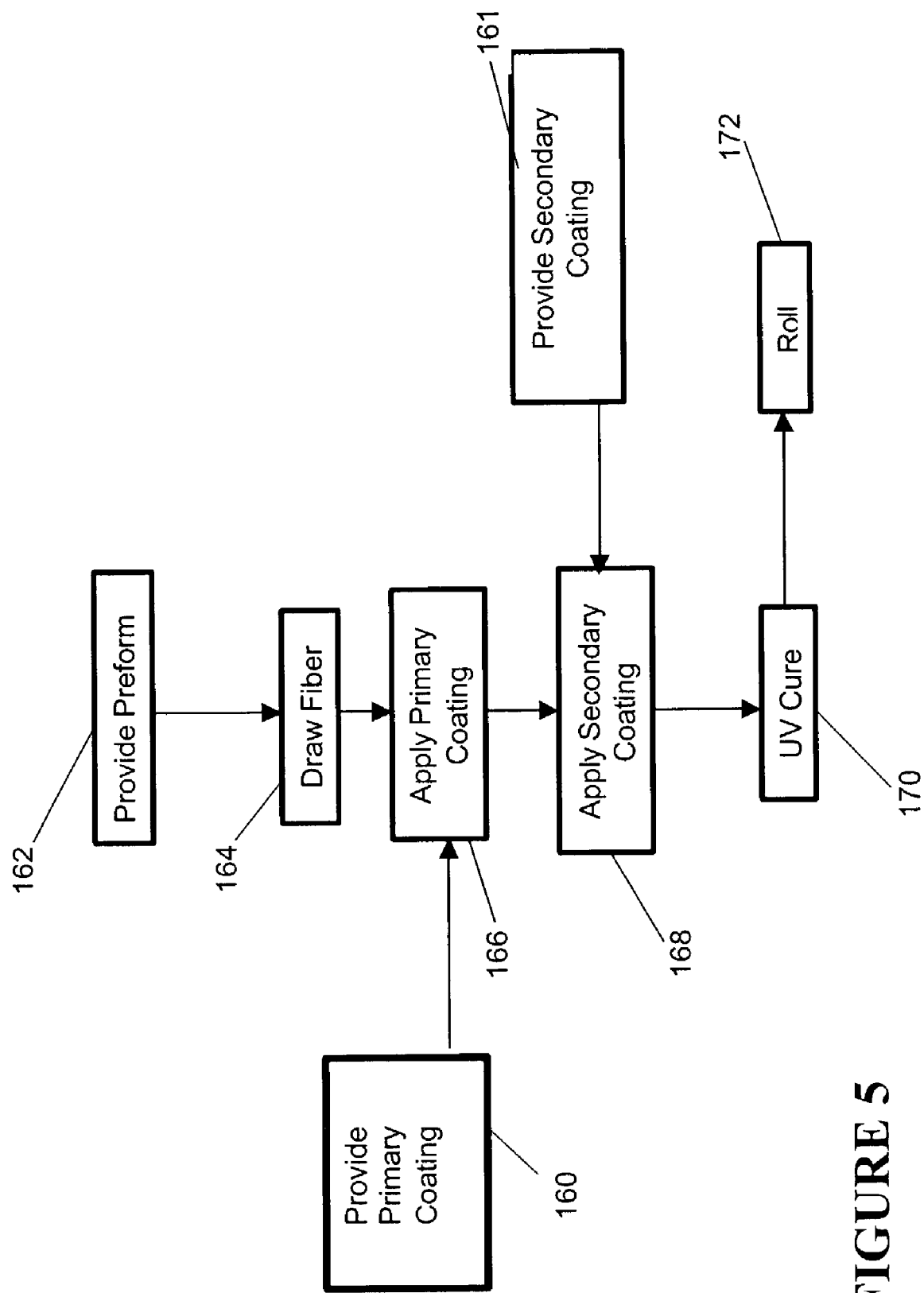
FIG. 5 is a diagrammatic representation of a fiber optic coating procedure used in accordance with the present invention.

FIG. 5 generally shows a process for making a coated glass fiber. In the process, a preform glass fiber material is provided (Step 162) and placed on a draw tower to allow a bare glass fiber to be drawn therefrom (Step 164). The surface of the bare drawn glass fiber is reactive and easily damaged. Thus, it is important to complete the coating operation before handling. Therefore, in the preferred wet-on-wet coating procedure, the primary coating is provided (Step 160) and applied to the bare drawn fiber (Step 166). Either simultaneously or shortly thereafter, a secondary coating composition is provided (Step 161) and applied over the primary coating (Step 168). Using a series of ultraviolet lamps, the two coatings are then cured in situ simultaneously (Step 170). Although such a wet-on-wet application is preferred, it is possible to at least partially cure the primary coating before applying the secondary coating. Finally, a capstan is used to draw the fiber from the draw tower and coil the coated fiber in a roll (Step 172). Furthermore, as indicated above, it is considered within the scope of the invention to eliminate the primary coating altogether, and only use a single coating.

Typically, the primary and secondary coating compositions are prepared at a site remote from where they are commercially applied to the glass fiber. Of course, if desired, the primary and secondary compositions can be manufactured and filtered at the site where they are commercially applied to the glass fiber.

Figure 6:
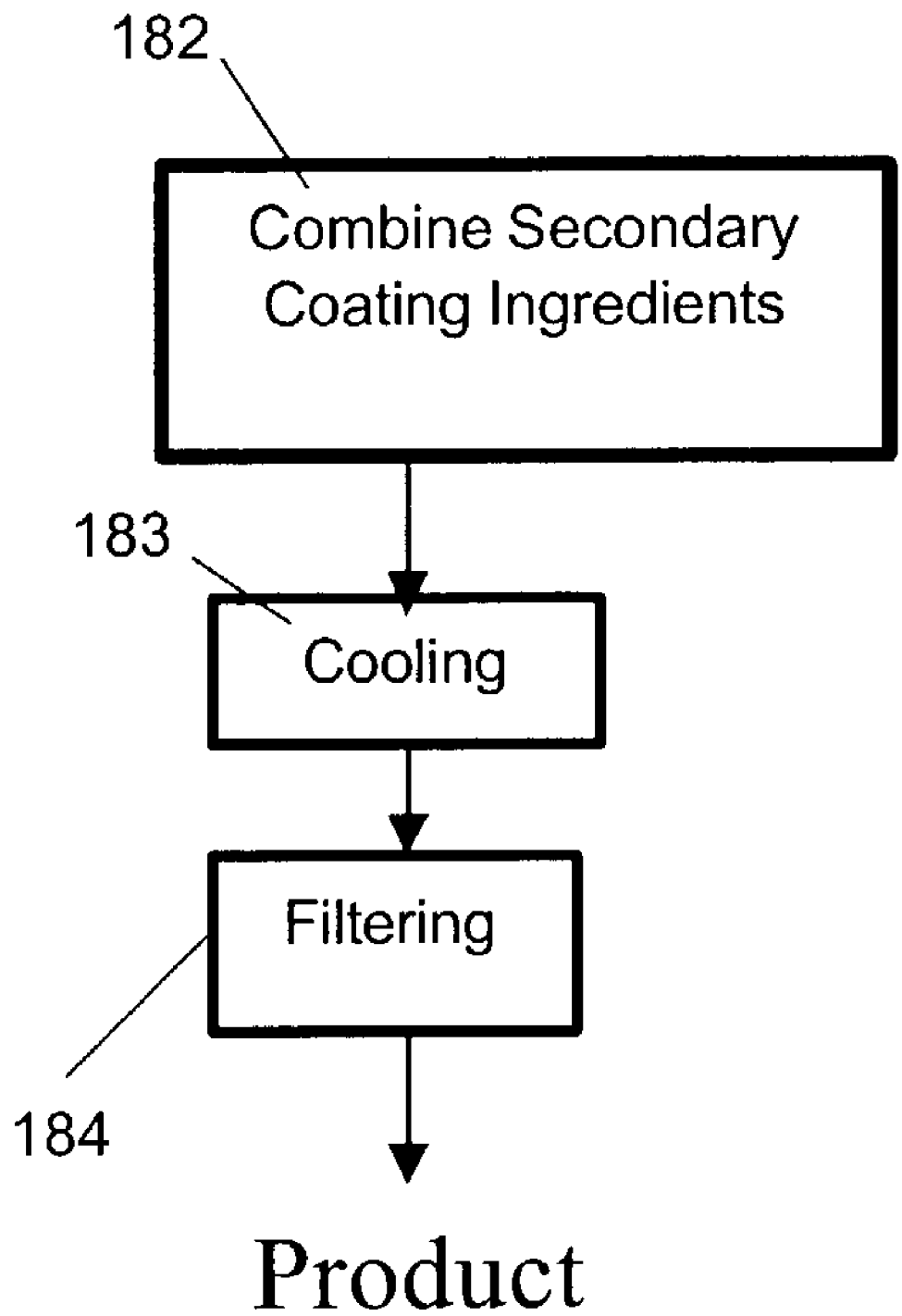
FIG. 6 is a diagrammatic representation of a process for filtering fiber optic coating compositions in accordance with the present invention.

FIG. 6 shows typical steps involved in preparing a secondary coating including combining the secondary coating ingredients to form a mixture (Step 182), cooling the mixture (Step 183), and then filtering the cooled mixture (Step 184) to form the secondary coating composition.

The combining of the secondary coating ingredients typically occurs at an elevated temperature, e.g. 140° F. (60° C.), to promote mixing and flowing of the ingredients. However, conventionally, the warm mixture is cooled to 105° F. (40.5° C.) and filtered at that temperature. A primary coating composition likewise typically is made by combining its ingredients to form a mixture at elevated temperature, cooling the mixture to a temperature suitable for filtering and then filtering the mixture to form the product primary coating composition. This filtering can be in a single stage, as shown by FIG. 6, or through a variety of stages. Steps 182, 183 and 184 are generally performed at a first location, where the filtered coating compositions are prepared and put into containers. The containers of coating compositions are then shipped to a second location, for being applied to glass fiber.

The present invention, unlike conventional processes, employs unique filtering conditions to unexpectedly remove point lumps. These conditions are explained as follows.

C. Filtering the Secondary Coating

Traditional filtering is conducted through a nylon filter having a pore size of 0.45 microns, a pressure drop (ΔP) between 40 and 60 psig and a temperature of 105° F.

In contrast, the present invention avoids these traditional conditions by varying one or more of these conditions to reduce or eliminate the number of point lumps present in the final product.

The present invention balances the parameters of temperature of filtering, pressure drop across at least one filter media of a filtering device, and pore size of the filter to obtain a filtration factor of less than or equal to 250,000 $s^{-1}$ in at least one filter media of the filtering device, preferably less than approximately 100,000, more preferably less than 50,000 $s^{-1}$, such as less than approximately 43,000 $s^{-1}$. The thickness of the filter media may also be a factor because thicker filters can have a larger pore size than a thinner filter and be very effective. However, the pressure drop parameter takes the pore size and thickness features into account because, at normal operating conditions, a thicker filter media would have a larger pressure drop than a thinner filter media of equal pore size.

As presented above, filtration factor (γ) is defined by the following general Formula I:

$$\frac{\Delta P (mPa)}{\eta (mPa \cdot s)} = \gamma(s^{-1}) \quad \text{(I)}$$

wherein ΔP is the pressure drop, and η is viscosity of the coating composition, through a respective filter media of the filtering device. Thus, filtration factor is calculated for each filtration assembly of the overall filtering device and it is determined if at least one of the filtration assembly of the overall filtering device has the appropriate filtration factor.

Typically, the filtration assembly comprises a support, for example an enclosure or a housing, which contains a single filter medium or parallel multiple filter media so that the ΔP is the pressure drop between the support inlet and the support outlet.

For example, the filtration assembly may comprise a housing, with one or more individual filter media, arranged in parallel, located therein. Also, it is considered within the scope of the present invention to utilize a filtering device having a single filter medium, in particular a single filter within a single housing. Also, it is considered within the scope of the present invention to utilize a plurality of filter media arranged in series, in particular a plurality of filter housings containing filter media wherein the housings are arranged in series. Also, it is considered within the scope of the present invention for the filtering device to comprise housings both in parallel and in series.

Preferably all the composition passes through at least one filter media that meets the desired filtration factor. For example, if the filtering device has three housings, wherein first and second parallel housings each contain three filter media in parallel and feed the third housing having a single filter media, then either the parallel housings (and thus their respective media) both have the desired filtration factor or the third housing (and thus its respective media) has the desired filtration factor.

Although not wishing to be bound by any theory, it is surmised that the point lumps are created by a gel formation in the secondary coating prior to application onto glass fiber. It is believed elevated temperatures allow the gel formation to partially dissolve or deform, and increased pressures give the partially dissolved or deformed gel formations the extra "push" needed to get through the narrow pore sizes. Therefore, it is theorized that reducing the temperatures and pressures minimizes the filtration factor and prevents the gel formations from becoming flexible enough to fit through the narrow pore sizes.

Filtration factor, in this case, can be defined as the ratio of pressure drop ($\Delta P$) to coating viscosity. The natural log of viscosity is directly proportional to the temperature of the fiber optic coating materials. As indicated above, a major factor in eliminating point lumps via filtering is the temperature at which the filtering is performed. If a conventional temperature of 105° F. is used, it must be balanced by using an unconventionally low pressure drop across the filter. It has also been discovered that high temperatures can cause degradation to the coating additives. However, lower than conventional temperatures are preferred.

Typically, filtering is performed at a temperatures less than approximately 120° F., for example between 50° and 120° F., or between 70° and 105° F. The preferred filtering temperature range is from 60° to 95° F. (15.5° to 32.2° C.), more preferably from 70° to 90° F. (21.2° to 32.2° C.) or even 70° to 80° F. (21.2° to 26.7° C.).

Although the resulting data shows that lowering the filtering temperature has a positive effect on the formation of point lumps, this effect is limited. It is believed that lowering the temperature too far, e.g., beyond about 50° F., would cause crystallization of secondary coating during filtering thereof. While the reduced temperature may limit the formation of point lumps in the final coated optical fiber, the formation of crystals within the coating solutions prior to application onto bare glass fiber would add other problems.

Additionally, with lower temperatures, the time required to complete any filtering step becomes extended as viscosity generally increases. With standard temperatures, e.g., 105° F., a typical flow rate through standard 30 inch cartridge filters is approximately 100 grams per minute for each 10 inches of filter utilized (multiple cartridge filtration devices are employed). However, lowering the temperature to 70° F. reduces flow rates during filtering by a factor of 4 to 1. This is caused by the increase in viscosity of the coating at the lower temperatures. In fact, secondary coating material and/or its individual components are generally heated to 140° F. to permit adequate pumping and mixing prior to filtering. Then, this secondary coating material is cooled prior to filtering. When filtering is conducted at a temperature much lower than the standard 105° F., additional cooling is required between the pumping/mixing and the filtering, adding cost and time to the manufacture of the coating solution. As a result, it is considered within the scope of the invention to increase the surface flow through area of the filters themselves or the filtration device total area (e.g., additional filter cartridges or larger filter surface area) when filtering at a lower temperature, to achieve the same flow rate obtained with higher temperature.

In the filtration factor Formula I, $\Delta P$ is pressure drop across a respective filter media in the filtering device. Traditional $\Delta P$ values are in a range with an upper limit of approximately 80 psig, for example between approximately 3 and approximately 40 psig. The present invention may employ $\Delta P$ from about 0 to 80 psig, 0 to 60 psig, or 5 to 60 psig, or 10 to 60 psig, across the respective filter media in the filtering device. However, using a pressure drop at the higher end of the range is balanced by using an unconventionally low filtering temperature. Thus, the ratio of pressure drop (mPa) to viscosity (mPa·s) is controlled to minimize the filtration factor to $\leq 250,000$ s$^{-1}$. Preferably the $\Delta P$ is from 35 to 55 psig, more preferably 40 to 50 psig. Maintaining $\Delta P$ at 40 psig and filtering at 70° F. (for a filtration factor of approximately 43,000 s$^{-1}$) has been effective with a variety of filter pore sizes.

It is understood that the above-described filtration factor may be used with a variety of different types of filters and filtering systems. The minimum filtration factor stated above is understood to encompass systems wherein the surface area of the filters is increased to allow the use of lower pressures. The described filtration factor accounts for coatings of different viscosities, as a coating with a high viscosity could be run at a higher temperature and exhibit the desired filtration factor.

In the present invention, the nominal rating for filter pore size is in a range with an upper limit of approximately 10 microns, for example from approximately 0.05 to approximately 10 microns, or approximately 0.45 to approximately 3 microns, from approximately 0.05 to approximately 5 microns, or from 0.1 to 3 microns.

It also considered within the scope of the invention to utilize a filter having an absolute rating for filter pore size in a range with an upper limit of approximately 10 microns, for example from approximately 0.05 to approximately 10 microns, or approximately 0.45 to approximately 3 microns, from approximately 0.05 to approximately 5 microns, or from 0.1 to 3 microns.

A nominal rating means that a filter will remove at least 50% of all particles equal to or larger, within a single pass. An absolute rating means that a filter will remove at least 99% of all particles, equal to or larger, within a single pass.

Pore size for the membrane filters, also known as mean pore size, range from about 0.05 to about 0.6 microns, preferably 0.1 to 4 microns. Preferred membrane filters have a pore size in the range of 0.1 microns to 0.45 microns. A typical membrane filter is a 0.45 microns pore size nylon membrane filter or 0.1 microns pore size PTFE membrane filter.

Absolutely rated pore size for depth filters, measured for example by the "bubble test" (see U.S. Pat. No. 5,468,382), preferably ranges from about 1 to 4 microns. Preferred depth filters have a pore size of from 1 to 3.0 microns. A typical depth filter is a 3.0 micron polypropylene depth filter.

Figure 7:
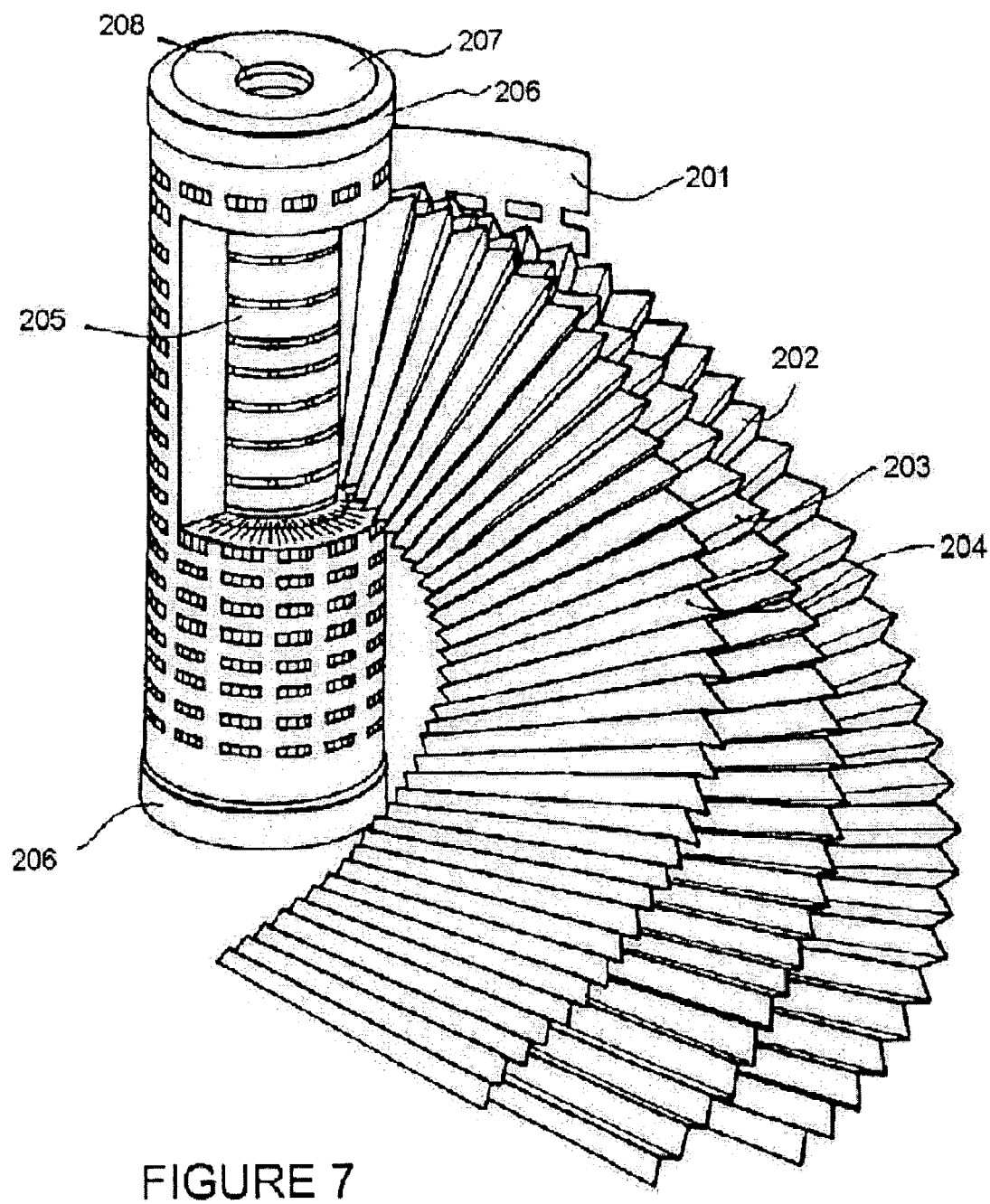
FIG. 7 is partial cut-away view of a membrane filter, used in accordance with the invention.
Figure 8:
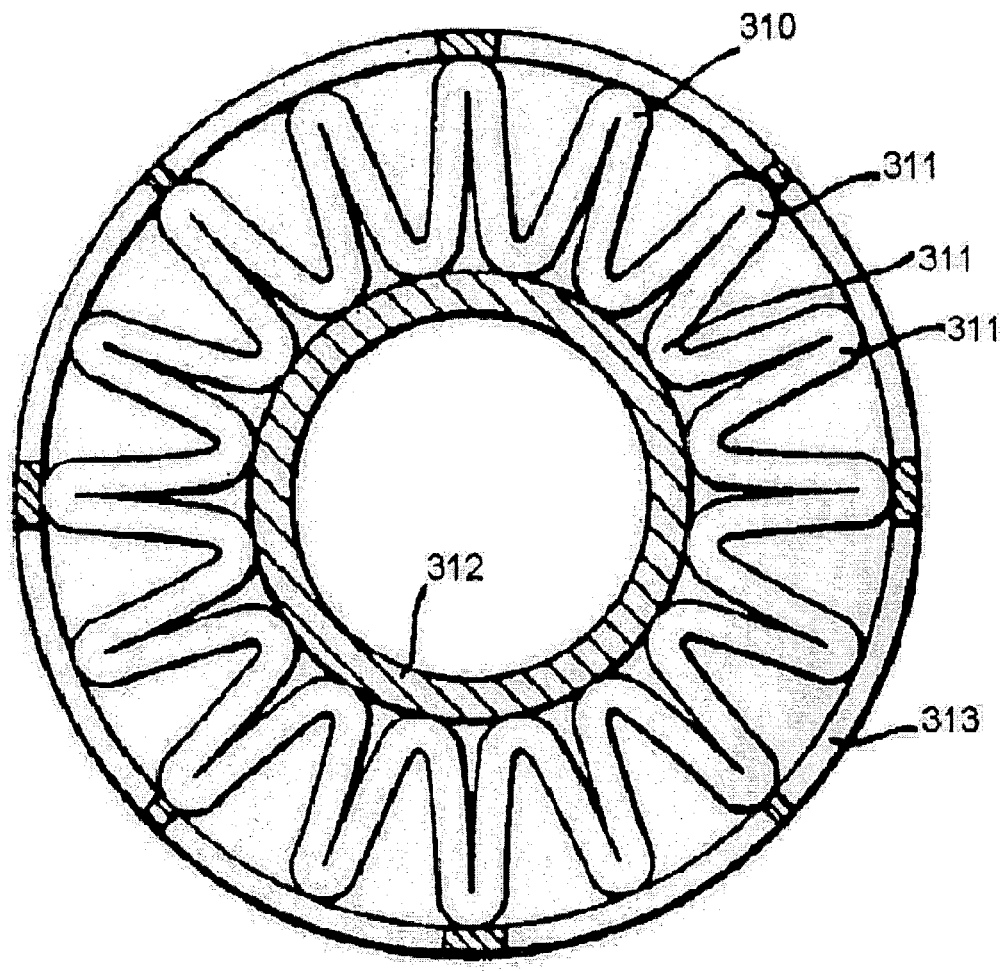
FIG. 8 is a transverse cross-section of a depth filter, used in accordance with the invention.

Membrane filters and depth filters are known in the art. FIGS. 7 and 8 show the structure of a conventional membrane filter and a depth filter, respectively, used in accordance with the invention. Conventional depth filter and membrane filter are typical filters which may be used in the filtering steps of the invention. Typical filters are shown and described in U.S. Pat. No. 5,279,731 to Cook et al., U.S. Pat. No. 5,468,382 to Ohtani and U.S. Pat. No. 5,846,421 to Cook et al. Each of these patents is hereby incorporated by reference in its entirety.

FIG. 7 shows a cut-away of a conventional membrane filter device which can be used in accordance with the invention, as shown and described in U.S. Pat. No. 5,846, 421. Specifically, FIG. 7 is a development view showing the overall structure of a general pleat-type membrane cartridge filter. A filter membrane 203 is pleated while interposed between two liquid-permeable sheets 202 and 204 and is wound on a core 205 having a large number of liquid collection ports. An outer circumferential guard 201 is provided in the outside of filter membrane 203 to protect the filter membrane 203. The precision filtration film membrane 203 is sealed by end plates 206 at opposite ends of the cylinder. The end plates 206 abut on a seal portion of a filter housing (not shown) through a gasket 207. Filtered liquid is collected from the liquid collection ports of the core 205 and comes out from an outlet 208.

FIG. 8 shows a transverse cross-section of a conventional depth filter device which may be used in accordance with the invention, in place of, or in combination with the membrane filter of FIG. 7. Such a depth filter device is shown and described in U.S. Pat. No. 5,468,382. The depth filter device comprises a generally cylindrical depth filter medium 310 provided with pleats 311. Each pleat 311 extends along the length of the filter medium and the pleats together extend parallel to one another around the filter. An inner support core 312 is arranged within the cylindrical depth filter medium and contacts inner pleats. An outer support cage 313 contacts the outer pleats.

The cylinder of depth filter medium 310 may be a continuous sleeve of filter medium without any side seal. A second possibility is to form the cylinder of filter medium 310 from a flat sheet of depth filter medium that has been sealed with a seal to form a cylinder. A third possibility is to roll a flat rectangular sheet into a cylindrical roll with opposed edges of the sheet overlapping at least once.

The filter medium may also be a fibrous structure such as polyolefins, polyesters, polyamides, glass fibers, cellulose fibers or metal fibers. For example, the depth filter element may be formed from fibers produced by a melt blowing process and having diameters from 1-20 microns, preferably 1-12 microns.

Filtering step 184 (FIG. 6) may be in a single stage or may be in a series of stages, as indicated. In one embodiment, step 184 is performed with a first filter, or a pre-filter, having a substantially greater pore size. Because filters have limited useable lifetimes, the cost of filters increases with decreasing pore sizes. Therefore, using a pre-filter with a larger pore size removes much of the large filtrate from the coating solution before a relatively expensive filter (with smaller pore size) is used. The final filter is typically the filter falling within the above-specified pore size ranges.

Throughout this description, it should be understood that where reference is made to a filtering device, multiple filter media may be utilized and vice-versa. Moreover, adjusting the filtering characteristics, such as by increasing surface area, will influence the filtration factor calculations, as the increased surface area will lower the resulting pressure drop.

Additionally, as stated above, an increase in surface area to achieve a lower $\Delta P$ is considered within the scope of the invention. However, the $\Delta P$ measurements are to be taken across each filtration assembly, whether the filtration assembly be a single filter with large or small surface area, or multiple filters in either a series or parallel arrangement. That is to say, $\Delta P$ is to be measured across each individual filtration assembly, irrespective of any other filtration assembly or device outside the filtering device.

For example, typical filtering includes a pump to draw the coating composition from a supply tank and direct the coating composition into a first filter. For this example it is assumed that the pump feeds the coating composition to a first filter at 40 psig. After the first filter, the coating composition flows to a second filter. However, in accordance with the invention, $\Delta P$ is to be measured across each individual filtration assembly, and is therefore not affected by external devices, upstream or downstream of the filters, such as pumps or heat exchangers. The entire device used in the present invention may also include one or more pressure gradient devices located between the inlet to the first filter and the outlet of the last filter, such as heat exchangers, pumps, or valves placed before, after or between the individual filters which do not contribute to the $\Delta P$ calculation. Temperature is the temperature of the composition in the respective filtration assemblies.

By following the steps outlined above, it is possible to limit the amount of point lumps present in a coating on a substrate, for example a coating on an optical fiber. The above described method produces coating composition for substantially point lump free cured coatings, for example wherein 0 to 0.001%, preferably 0 to 0.0001% of the coating surface has point lumps as measured by the below described procedure. For example, the above-described method can produce an optical fiber with an average from 0 to 10 point lumps per kilometer, preferably from 0 to 5 point lumps per kilometer, more preferably 0 to 2 point lumps per kilometer.

Accordingly, the method of the invention can be used to ensure that batches of filtered coatings result in coated optical fibers having on average, less than 10, typically less than 5, less than 2, or 0, point lumps per kilometer.

The present invention achieves a much lower scrap rate than conventional processing. In industrial scale manufacture of the coating materials according to the present invention, typically 50-1000 tons, such as 500-1000 tons, per any consecutive 12 month period productions comprised of continuous product or multiple batches, the present invention can be used to ensure the coating composition is suitable for consistently producing optical fibers having, on average, less than approximately 10, less than approximately 5, or approximately 0 point lumps per kilometer.

For example, the batches are suitable such that at least 98% of the optical fibers coated with the material of the present invention have less than about 10 point lumps, less than about 5 point lumps, less than about 2 point lumps, or about 0 point lumps, per respective kilometer. For example, for 1000 kilometers of optical fibers, at most 20 kilometers have more than 10 point lumps per each kilometer of those 20 kilometers. Preferably, at least 99% of the coated optical fibers have less than about 10 point lumps, less than about 5 point lumps, less than about 2 point lumps, or about 0 point lumps, per kilometer; or at least 99.75% of the coated optical fibers have less than about 10 point lumps, less than about 5 point lumps, less than about 2 point lumps, or about 0 point lumps, per kilometer; or 100% of the coated optical fibers have less than about 10 point lumps, less than about 5 point lumps, less than about 2 point lumps, or about 0 point lumps, per kilometer. Thus, the scrap rate due to point lumps for the final product made from 50 tons of the final composition is at most about 2%, preferably at most about 1%, more preferably at most about 0.25%.

The number of point lumps can be determined after both the primary coating and filtered secondary coating have been applied to the glass fiber and cured thereon, with the following procedure:

1. Visually locate a defect on the spooled optical fiber or piece of fiber. Hold the fiber up to a light and look for a bulge or a dot on the fiber. A bulge may also be identified by feeling the surface of the coated optical fiber.

2. Setup a color camera (e.g., SONY 3CCD) through a microscope (e.g., LECIA DMRX) with a 200× objective lens (200× magnification, although higher magnification may be required to view some defects).

3. Adjust lighting techniques, including brightfield and rotation of fiber, to visualize defects. Position of the fiber is important.

4. Note the characteristics of the defect visible via magnification. A point lump may be indicated by a gel-like formation having a similar refractive index as the coatings or simply a perturbation as described above without any visible inclusions.

This procedure for determining point lumps may also be applied to coating compositions on other substrates.

If desired, the primary coating material may be filtered by the method described above for the secondary coating.

D. Method of Drawing Optical Fiber

Figure 9:
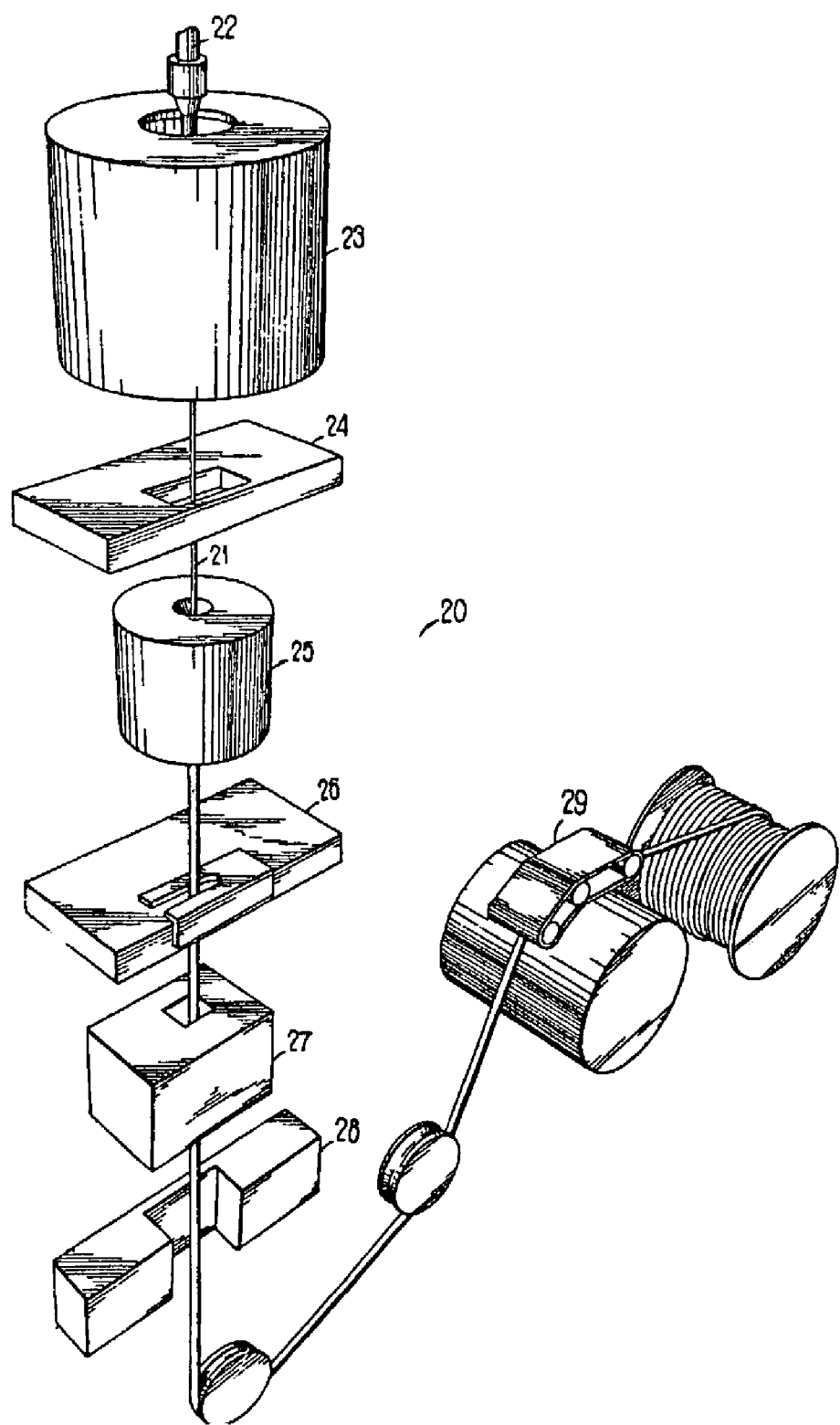
FIG. 9 is an overall perspective view of an apparatus for drawing an glass fiber.
Figure 10:
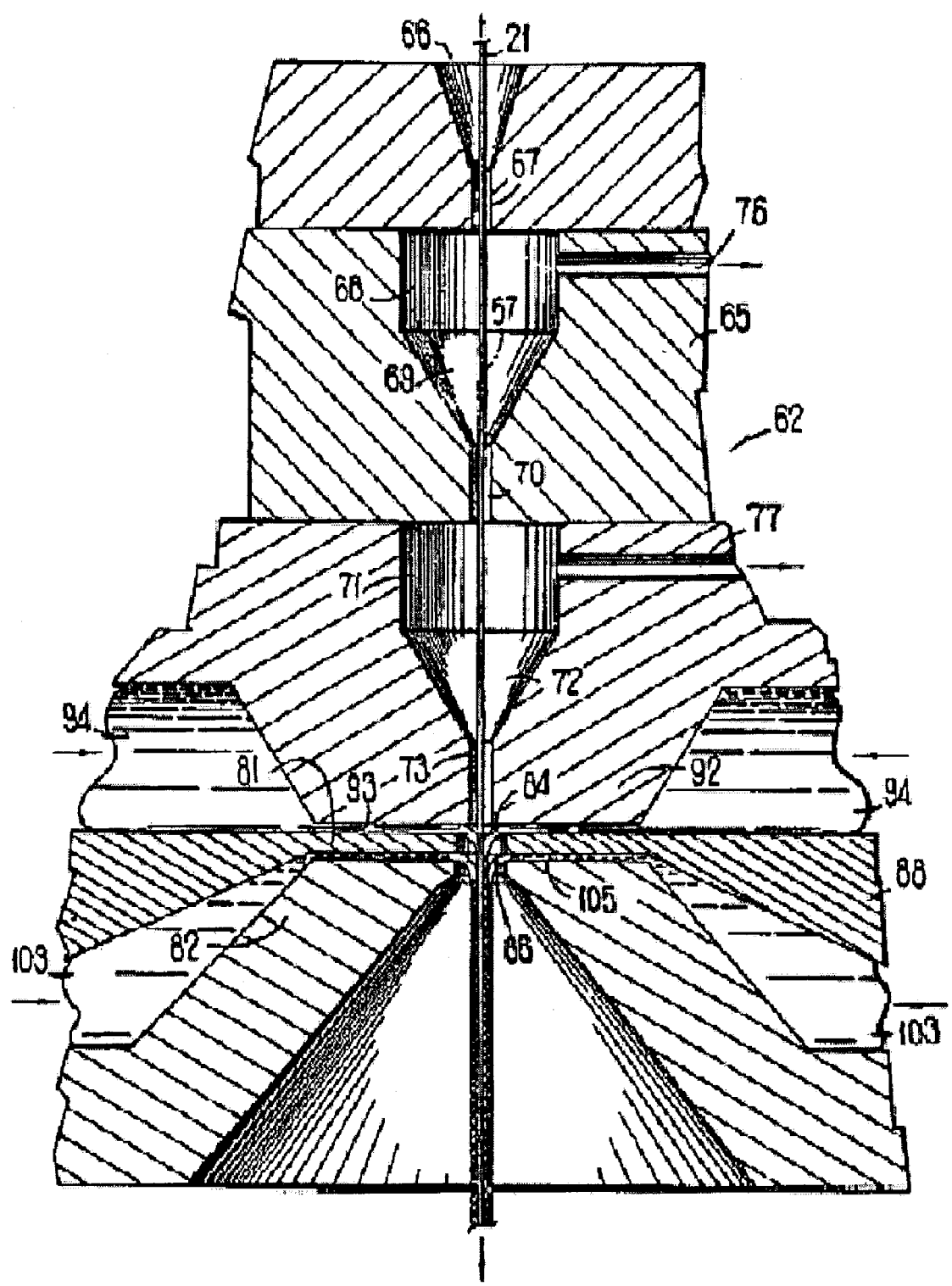
FIG. 10 is a transverse cross-section of a portion of an apparatus for applying coating compositions onto a drawn glass fiber.

In the method of the invention, bare glass fiber 112, 122, 132, 142 is drawn from a molten glass preform in the conventional manner, shown in FIGS. 5, 9 and 10, and is generally taught by U.S. Pat. No. 4,913,859, herein incorporated by reference in its entirety. However, the particular method of forming glass fiber 112, 122, 132, 142 does not constitute part of the present invention.

FIG. 9 shows an apparatus designated generally by the numeral 20 and used to draw an optical fiber 21 from a specially prepared cylindrical preform 22 and then to coat the optical fiber 21. The optical fiber 21 is formed by locally and symmetrically heating the preform 22 which typically is about 17 mm in diameter and 60 cm in length to a temperature of about 2000° C. As the preform 22 is fed into and through a furnace 23, optical fiber 21 is drawn from the molten material.

As can be seen in FIG. 9, the draw system includes the furnace 23, wherein the preform 22 is drawn down to the optical fiber size, after which the optical fiber 21 is pulled from the heat zone. The diameter of the optical fiber 21 measured by a device 24 at a point shortly after the furnace 23 becomes an input into a control system. Within the control system, the measured diameter is compared to the desired value and an output signal is generated to adjust the draw speed such that the fiber diameter approached the desired value.

After the diameter of the optical fiber 21 is measured, the coating materials, including primary coating and secondary coating, are applied by an apparatus 25, shown in more detail in FIG. 10 and discussed below. Then, after the coated optical fiber 21 is passed through a centering gauge 26, an ultraviolet (UV) device 27 for treating the coating materials to cure the coating materials and a device 28 for measuring the outer diameter of the coated fiber, it is moved through a capstan 29 and is spooled for testing and storage prior to subsequent operations or sale. The preservation of the intrinsically high strength of optical fibers is important during the ribboning, jacketing, connectorization and cabling of the optical fibers and during their service lives.

FIG. 10 shows a typical embodiment of a coating applicator 62 for applying coating materials including a primary coating and a secondary coating to a moving optical fiber. The applicator has an axis 57 along which the optical fiber is moved. The applicator 62 is used to apply a single layer of each of primary coating and secondary coating to an optical fiber 21.

The coating applicator 62, shown in detail in FIG. 10, includes a housing 65 having a flared entrance 66 into which successive increments of the optical fiber 21 are advanced. The flared entrance 66 connects to a cylindrical passageway 67 which opens to a first chamber 68. A lower portion 69 of the first chamber 68 is conically shaped and communicates with a cylindrical passageway 70 that opens to a second chamber 71. A lower portion 72 of the second chamber 71 is conically shaped and communicates with a cylindrical passageway 73.

The applicator 62 is operated such that a pressure differential exists between the chambers 68 and 71 and the ambient atmosphere with the ambient pressure being greater than that in the chambers. In a typical embodiment, the chambers 68 and 71 are connected along lines 76 and 77, respectively, to a source of vacuum (not shown).

Aligned with the cylindrical passageways 67, 70 and 73 are first and second dies 81 and 82 having die openings 84 and 86, respectively. Each of the die openings 84 and 86 is defined by a wall, or land. As used herein, the term "die" denotes that portion of the applicator which last confines or aids in confining a given coating layer around the fiber. It should be observed that, in one embodiment, the die openings 84 and 88 associated with the first and second dies, respectively, have a substantially larger diameter than those of the passageway 73. On the other hand, the diameters of the passageways 67 and 70 can be larger or smaller than those of the die openings. However, in a typical embodiment they are relatively small to inhibit the inflow of air. Typically, each of the openings 84 and 86 has a diameter equal to about the product of 1.5 and the outer diameter of the optical fiber.

Furthermore, the applicator is arranged to provide flow paths for both materials. Such a disc-like flow path is shown in U.S. Pat. No. 4,474,830 and in U.S. Pat. No. 4,512,944, both of which patents are herein incorporated by reference. Clearance between surfaces, described therein, define a flow path 93 for a first coating material 94 which provides a cushioning layer 64 for the optical fiber. The flow path 93 has at least a component that is normal to the path of travel of the optical fiber along the longitudinal axis 57. In a typical embodiment, the flow path 93 is disc-like and is normal to the path of travel of the optical fiber. Further, the thickness of the flow path 93 in a direction parallel to the path of travel of the optical path is relatively small, being on the order of about 2 to 10 mils. That dimension of the clearance which is parallel to the path of travel of the optical fiber along the axis 57 in the vicinity of the point of application of the coating material is referred to as its thickness and typically is less than three times the fiber diameter. Typically, the clearance is less than twice the optical fiber diameter.

In fact, any method now known or later developed of providing a drawn bare glass fiber is sufficient for use in the method of this invention. Additionally, while a wet-on-wet process is preferred for coating glass fiber with a primary coating and a secondary coating, it is considered within the scope of the invention to use the methods of the invention in a wet-on-dry coating process.

The present invention can be used with any composition of primary and secondary coatings. Thus, the particular compositions of the primary coating and the secondary coating are not considered part of the present invention. However, descriptions of typical primary and secondary coating compositions thereof are described below for completeness.

E. Coating Compositions

1. Primary Coating

The primary coating used with the present invention may be of any form conventionally known in the art. However, it may be typically formed from the following components (1) (meth)acrylate-terminated urethane oligomer; (2) monomer diluent; (3) optional adhesion promoter; (4) optional photoinitiator and (5) optional stabilizer, as described in U.S. Pat. No. 6,014,488 to Shustack, incorporated herein by reference in its entirety. It is also considered within the scope of the present invention to supply no primary coating, i.e. using only a single coating to protect the glass fiber.

a. Oligomer

The (meth)acrylate-terminated urethane oligomer is selected to be capable of homopolymerization to form the main structure of primary coating 30. The acrylate- or methacrylate-terminated ingredient is a wholly aliphatic urethane acrylate or methacrylate oligomer.

The urethane acrylate or methacrylate oligomer comprises from about 10 percent to about 80 percent by weight of the uncured primary coating material (composition), based on the total weight of the composition. Preferably, this oligomer component comprises from about 15 percent to about 70 percent, and more preferably about 20 percent to about 60 percent by weight of the composition based upon the total weight of all ingredients. The acrylate- or methacrylate-terminated urethane oligomer which may be utilized in the present invention is the reaction product of (i) an aliphatic polyol; (ii) an aliphatic polyisocyanate; and (iii) an endcapping monomer capable of supplying a reactive terminus, either acrylate or methacrylate.

However, it is the functional backbones of the oligomer, rather than the end groups, that confer the excellent properties upon the compositions. Thus, systems analogous to the above-described acrylate- or methacrylate-based compositions, but bearing any reactive end groups, are equally suitable in meeting these requirements Thus, the (meth) acrylate may be replaced in-part, or by whole be replaced with various other exemplary end groups capable of reacting upon irradiation or other means, either by free radical initiation or cationic cure, to provide excellent performance coatings. Such end groups include free radical systems, such as thiolene systems (based on the reaction of multifunctional thiols and unsaturated polyenes, such as vinyl ethers; vinyl sulfides; allylic ethers; and bicyclic enes); amine-ene systems (based on the reaction of multifunctional amines and unsaturated polyenes); acetylenic systems; systems wherein the reactive portion of the component is internal rather than terminal; other vinylic (e.g., styrenic) systems; acrylamide systems; allylic systems; itaconate systems and crotonate systems; and cationic cure systems such as onium salt-induced vinyl ether systems and epoxy-terminated systems which react by ring-opening; and any others based on compounds possessing reactive termini as taught by U.S. Pat. No. 5,639,846 to Shustack, herein incorporated by reference in its entirety. In fact, virtually any end groups which cure by irradiation or other means but do not adversely effect the desirable properties (i.e., the oxidative, thermal and hydrolytic stability and the moisture resistance) of the cured composition are envisioned. Examples of compounds which may be used for the endcapping monomer include but are not limited to acrylates, methacrylates, vinyl ethers, vinyl sulfides, allyls, bicyclic enes, mercaptans, acetylenes, epoxides, amines, styrenes, acrylamides, and so forth. Suitable hydroxyl-terminated compounds which may be used as the endcapping monomer include but are not limited to hydroxyethyl acrylate; hydroxyethyl methacrylate; hydroxypropyl acrylate; hydroxypropyl methacrylate; hydroxybutyl acrylate; hydroxybutyl methacrylate; allyl ether; hydroxyethyl vinyl ether; hydroxypropyl vinyl ether; hydroxybutyl vinyl ether; hydroxyethyl mercaptan; hydroxypropyl mercaptan; hydroxyethyl-3-mercaptopropionate; and hydroxypropyl-3-mercaptopropionate.

Examples of the polyol (i) may include polyether polyols; hydrocarbon polyols; polycarbonate polyols; polyisocyanate polyols; and mixtures thereof. Polyols which should be limited or preferably excluded include polyester or epoxy backbones. The polyether polyol is typically based on a straight chain, branched or cyclic alkylene oxide wherein the alkyl group contains about one to about twelve carbon atoms. Such polyether polyols include but are not limited to polytetramethylene polyol, polymethylene oxide, polyethylene oxide, polypropylene oxide, polybutylene oxide, isomers thereof, and mixtures thereof. A polyether polyol may also include at least some units of polytetramethylene oxide and/or polypropylene oxide.

The oligomeric component may contain very small amounts of urethane acrylates based on polyesters, but may contain only the above kinds of oligomers, for optimal long term stability.

A typical polyether polyol is based on a straight chain, cyclic, or branched alkylene oxide wherein the alkyl group contains from one to about twelve carbon atoms. The polyether polyol may be prepared by any method known in the art, and may have a number average molecular weight (Mn), as determined in this case by vapor pressure osmometry (VPO), per ASTM D-3592, sufficient to give the entire oligomer based thereon a molecular weight of not more than about 6,000 daltons. Examples of such polyether polyols include but are not limited to polytetramethylene polyol, polymethylene oxide, polyethylene oxide, polypropylene oxide, polybutylene oxide, isomers thereof, and mixtures thereof.

Representative hydrocarbon polyols which may be used include, but are not limited to, those based on linear or branched hydrocarbon polymers of from 600 to 4,000 weight molecular weight (number) average such as fully or partially hydrogenated 1,2-polybutadiene; 1,2-polybutadiene hydrogenated to an iodine number of from 9 to 21; and fully or partially hydrogenated polyisobutylene.

Representative polycarbonate polyols include but are not limited to the reaction products of dialkyl carbonate with an alkylene diol, optionally copolymerized with alkylene ether diols.

The polyisocyanate component (ii) may be non-aromatic. Non-aromatic polyisocyanates of from 4 to 20 carbon atoms may also be employed. Suitable saturated aliphatic polyisocyanates include but are not limited to isophorone diisocyanate; dicyclohexylmethane-4,4'-diisocyanate; 1,4-tetramethylene diisocyanate; 1,5-pentamethylene diisocyanate; 1,6-hexamethylene diisocyanate; 1,7-heptamethylene diisocyanate; 1,8-octamethylene diisocyanate; 1,9-nonamethylene diisocyanate; 1,10-decamethylene diisocyanate; 2,2,4trimethyl-1,5-pentamethylene diisocyanate; 2,2'-dimethyl-1,5-pentamethylene diisocyanate; 3-methoxy-1,6-hexamethylene diisocyanate; 3-butoxy-1,6-hexamethylene diisocyanate; omega, omega-dipropylether diisocyanate; 1,4-cyclohexyl diisocyanate; 1,3-cyclohexyl diisocyanate; trimethylhexamethylene diisocyanate; 1,3-bis(isocyanatomethyl) cyclohexane; 1,4-diisocyanato-butane; biuret of hexamethylene diisocyanate; norbornane diisocyanatomethyl 2,5(6)-bis(isocyanatomethyl)bicyclo (2,2,1) heptane and mixtures thereof.

Isophorone diisocyanate is a possible form for the aliphatic polyisocyanate. Suitable aromatic polyisocyanates also include toluene diisocyanate; diphenylmethylene diisocyanate; tetramethyl xylylene diisocyanate; 1,3-bis(isocyanatomethyl) benzene; p,m-phenylene diisocyanate; 4,4'-diphenylmethane diisocyanate; dianisidine diisocyanate (i.e., 4,4'-diisocyanato-3,3'-dimethoxy-1,1'-biphenyl diisocyanate); tolidine diisocyanate (i.e., 4,4'-diisocyanato-3,3'-dimethy-1,1'-biphenyl diisocyanate); and mixtures thereof.

The reaction rate between the hydroxyl-terminated polyol and the diisocyanate may be increased by use of a catalyst in the amount of 100 to 200 ppm. Suitable catalysts include but are not limited to dibutyl tin dilaurate, dibutyl tin oxide, dibutyl tin di-2-hexoate, stannous oleate, stannous octoate, lead octoate, ferrous acetoacetate, and amines such as triethylamine, diethylmethylamine, triethylenediamine, dimethylethylamine, morpholine, N-ethyl morpholine, piperazine, N,N-dimethyl benzylamine, N,N-dimethyl laurylamine, and mixtures thereof.

The endcapping monomer (iii) may be one which is capable of providing at least one reactive terminus and which preferably provides acrylate or methacrylate termini. Suitable hydroxyl-terminated compounds which may be used as the endcapping monomers include, but are not limited to, hydroxyalkyl acrylates or methacrylates. Systems analogous to the acrylate- or methacrylate-based compositions, but bearing any reactive end groups, are equally suitable. Various other exemplary end groups capable of reacting upon irradiation or other means, either by free radical initiation or cationic cure, to provide excellent performance coatings include, but are by no means limited to, free radical systems such as thiolene systems (based on the reaction of multifunctional thiols and unsaturated polyenes, such as vinyl ethers; vinyl sulfides; allylic ethers and bicyclicenes); amine-ene systems (based on the reaction of multifunctional amines and unsaturated polyenes); acetylenic systems; systems wherein the reactive portion of the component is internal rather than terminal; other vinylic (e.g., styrenic) systems; acrylamide systems; allylic systems; itaconate systems and crotonate systems; and cationic cure systems such as onium salt-induced vinyl ether systems and epoxy-terminated systems which react by ring-opening; and any others based on compounds possessing reactive termini. In fact, virtually any end groups which cure by irradiation or other means but do not adversely effect the desirable properties (i.e., the oxidative, thermal and hydrolytic stability and the moisture resistance) of the cured composition are envisioned. The analogous systems are further disclosed by U.S. Pat. Nos. 5,352,712 and 5,527,835 to Shustack, incorporated herein by reference in their entirety.

Typical acrylates and methacrylates include hydroxyethyl acrylate, hydroxyethyl methacrylate, hydroxypropyl acrylate, hydroxypropyl methacrylate, hydroxybutyl acrylate, hydroxybutyl methacrylate, and so forth.

The molar ratio of the polyol, diisocyanate and endcapping monomer may be approximately 1:2:2.

b. Monomer

The monomer diluent component which is reacted with the above-described oligomer in preparing the primary coating layer of the invention is generally selected to be one that is compatible with the oligomers above. In such a case, it should be reactive with the above-described oligomers, and may have one or more acrylate or methacrylate moieties per monomer. The monomer diluent may also be capable of lowering the $T_g$ (glass transition temperature) of the cured primary coating composition, and of lowering the viscosity of the uncured (liquid) composition to within the range of about 1,000 to about 10,000 cps (centipoises) at 25° C.

The monomer diluent may also comprise about 10 to about 75 percent by weight of the uncured (liquid) composition, based on the total weight of the composition (all ingredients).

Suitable examples of monomer diluents include, but are not limited to, aromatic-containing monomers such as phenoxyalkyl acrylates or methacrylates (e.g., phenoxyethyl (meth)acrylate); phenoxyalkyl alkoxylate acrylates or methacrylates (e.g., phenoxyethyl ethoxylate(meth)acrylate or phenoxyethyl propoxylate(meth)acrylate); paracumylphenol ethoxylated (meth)acrylate; 3-acryloyloxypropyl-2-N-phenylcarbamate; or one of any other such monomer diluents known to adjust the refractive index thereof. Combinations including one or more of these are suitable as well. Such monomer diluents belonging to the later category are disclosed and described in U.S. Pat. No. 5,146,531 to Shustack herein incorporated by reference and may, for example, contain (1) an aromatic moiety; (2) a moiety providing a reactive (e.g., acrylic or methacrylic) group; and (3) a hydrocarbon moiety.

Samples of aromatic monomer diluents additionally containing hydrocarbon character and a vinyl group include but are not limited to polyalkylene glycol nonylphenylether acrylates such as polyethylene glycol nonylphenylether acrylate or polypropylene glycol nonylphenylether acrylate; polyalkylene glycol nonylphenylether methacrylates such as polyethylene glycol nonylphenylether methacrylate or polypropylene glycol nonylphenylether methacrylate; and mixtures thereof.

Such monomers are, for example, available from Toagasei Chemical Industry Company, Ltd., Tokyo, Japan under the trade names ARONIX M110, M111, M113, M114, and M117, and from Henkel Corporation, Ambler, Pa., under the trade name PHOTOMER 4003.

Other suitable monomer diluents may additionally include hydrocarbon alkyl acrylates or methacrylates which are either straight chain or branched, and may contain 8 to 18 carbon atoms in the alkyl moiety such as hexyl acrylate; hexyl methacrylate; ethylhexyl acrylate; ethylhexyl methacrylate; isooctyl acrylate; isooctyl methacrylate; octyl acrylate; octyl methacrylate; decyl acrylate; decyl methacrylate; isodecyl acrylate; isodecyl methacrylate; lauryl acrylate; lauryl methacrylate; tridecyl acrylate; tridecyl methacrylate; myristyl acrylate; myristyl methacrylate; palmitic acrylate; palmitic methacrylate; stearyl acrylate; stearyl methacrylate; cetyl acrylate; cetyl methacrylate; $C_{14}$-$C_{15}$ hydrocarbon diol diacrylates; $C_{14}$-$C_{15}$ hydrocarbon diol dimethacrylates; and mixtures of the above.

Also suitable are cyclic monomers such as isobonyl acrylate; isobonyl methacrylate; dicyclopentenyl acrylate; dicyclopentenyl methacrylate; dicyclopentenyl ethoxylate acrylate; dicyclopentenyl ethoxylate methacrylate; tetrahydrofurfuryl acrylate; tetrahydrofurfuryl methacrylate; and mixtures thereof. Also suitable is TONE M-100 monomer, a caprolactone acrylate available from Union Carbide Corp., Danbury, Conn., GENORAD 1122 monomer available from Hans Rahn, Zurich, Switzerland, which is 2-propenoic acid, 2-(((butyl)amino)carbonyloxy)ethylester, and N-vinyl caprolactam.

Typical monomers include the refractive-index modifying type monomers as disclosed herein, alone or in combination with an alkyl (meth)acrylate such as lauryl acrylate.

c. Adhesion Promoter

An adhesion promoter may also be included in the primary coating composition. Adhesion becomes a particularly pertinent problem in high humidity and high temperature environments, where delamination is more of a risk. For uses protected from such environments, an adhesion promoter may be required.

It is known in the art to use either acid-functional materials or organofunctional silanes to promote adhesion of resins to glass. Acid-functional materials are operative herein, such as organofunctional silanes. Silanes are also suitable adhesion promoters. Additionally, in some environments it may be useful to have an adhesion promoter having a functionality which binds in with the system during cure, again to minimize the quantities of unbound volatiles. Various suitable organofunctional silanes include but are not limited to acrylate-functional silanes; amino-functional silanes; mercapto-functional silanes; methacrylate-functional silanes; acrylamido-functional silanes; allyl-functional silanes; and vinyl-functional silanes. The adhesion promoters may be methoxy- or ethoxy-substituted as well. Useful organofunctional silanes include but are not limited to mercaptoalkyl trialkoxy silane, (meth)acryloxyalkyl trialkoxy silane, aminoalkyl trialkoxy silane, mixtures thereof, and the like. Methacrylated silanes are suitable, because they bind well with the cured system. The mercapto-functional adhesion promoters also chemically bind in during cure, but do not appreciably slow down the cure speed of the system.

Some organofunctional silanes that enhance adhesion in humid conditions include 3-acryloxypropyltrimethoxy silane, vinyl-tris(2-methoxyethoxysilane), 3-methacryloxypropyltrimethoxy silane, 3-aminopropyltriethoxy silane, 3-mercaptopropyl trimethoxy silane and 3-mercaptopropyl triethoxy silane, and mixtures thereof. Other adhesion promoters include 3-acryloxypropyltrimethoxy silane.

The silane component may be incorporated into the composition which is to be cured to form the primary coating layer in a small but effective amount to enhance the adhesion of the composition to the surface of the substrate. The silane component therein may comprise from about 0.1 percent to about 3.0 percent by weight of the composition, based on total weight of all ingredients. The silane may also comprise from about 0.2 percent to about 2.0 percent, based on the total weight of the composition.

d. Photoinitiator

The primary coating may also include a photoinitiator. The necessity for this component depends on the envisioned mode of cure of the composition. If the composition is to be ultraviolet cured, a photoinitiator may be required. On the other hand, if the coating is to be cured by an electron beam, the photoinitiator may be eliminated.

In the ultraviolet cure embodiment, the photoinitiator, when used in a small but effective amount to promote radiation cure, may be used to provide reasonable cure speed without causing premature gelation of the composition.

Suitable photoinitiators include, but are not limited to, the following: hydroxycyclohexylphenyl ketone; hydroxymethyl-phenylpropanone; dimethoxyphenylacetophenone; 2-methyl-1-(4-methyl (thio)phenyl)-2-morpholinopropanone-1; 1-(4-isopropylphenyl)-2-hydroxy-2-methylpropan-1-one; 1(4-dodecylphenyl)-2-hydroxy-2-methylpropan-1-one; 4-(2-hydroxyethoxy)phenyl-(2-hydroxy-2-propyl) ketone; diethoxyacetophenone; 2,2-di-sec-butoxyacetophenone; diethoxy-phenyl acetophenone; and mixtures of thereof.

A suitable class of photoinitiators are the triacylphosphine oxides, such as trimethylbenzoyldiphenyl-phosphine oxide (available from BASF Corp., Chemicals Division, Charlotte, N.C. as LUCIRIN TPO), trimethylbenzoylethoxyphenylphosphine oxide (available from BASF as LUCIRIN 8893); bis-(2,6-dimethoxybenzoyl)-2,4,4-trimethylpentyl phosphine oxide (available from Ciba-Geigy Corp., Ardsley, N.Y.); bis-(2,6-dimethoxybenzoyl)-2,4,4-trimethyl pentyl phosphine oxide (sold as a component of CGI 1700 or CGI 1800 available from Ciba-Geigy Corp., Ardsley, N.Y.); bis-(2,4,6-trimethylbenzoyl) phenylphosphine oxide; and mixtures thereof.

The photoinitiator, when used, may comprise from about 0.5 percent to about 10.0 percent by weight of the uncured composition, based upon the weight of the total composition. The amount of photoinitiator may be from about 1.0 percent to about 6.0 percent. The photoinitiator may be used at a level such that a cure speed, as measured in a dose versus modulus curve, of less than 0.7 J/cm$^2$, is obtained.

2. Secondary Coating

The secondary coating used in the present invention may also be of any form conventionally known in the art. For example, a typical secondary coating is described in U.S. Pat. No. 6,014,488 or U.S. Pat. No. 5,352,712 to Shustack, both of which are hereby incorporated by reference in its entirety.

The secondary coating described therein includes:

(I) from about 10 percent to about 90 percent by weight of an aliphatic urethane oligomer based on a polyester and/or polyether and containing a reactive terminus;

(II) from about 20 percent to about 60 percent by weight of a hydrocarbonaceous viscosity-adjusting component capable of reacting with the reactive terminus of (I);

(III) optionally, from about 0.05 percent to about 10.0 percent by weight of a photoinitiator, all of the stated percentages by weight being based upon the total weight of (I), (II) and (III).

The reactive termini of the secondary coating may be any of those disclosed as suitable for the primary coating and may or may not, in the case of a two-coat system, be the same termini as in the primary coating, so long as the chemistries of the end groups do not interact adversely, e.g., amine-ene systems and cationic cure systems. As with the primary coating, "hybrid" compositions may also be used for the secondary coating.

a. Oligomer

A first component (I) of the secondary coating composition may be an aliphatic urethane oligomer based on a polyester and/or polyether and having a reactive terminus.

Commonly used prior art oligomers in UV-curing systems include acrylated polyesters, epoxies and urethanes. Acrylated polyesters are undesirable inasmuch as they are susceptible to hydrolysis on high temperature hydrolytic aging. With respect to the acrylated urethanes, both aromatic and aliphatic isocyanate-based urethanes are suitable. Aliphatic urethanes do not possess deficiencies of poor thermal and oxidative stability.

When a polyether-based urethane is used it may be necessary to add various thermal stabilizers and antioxidants.

It is also possible to use urethanes based on a mixture of polyesters and/or polyethers. Such mixture can be formed either by mixing preformed terminally reactive polyether urethanes with preformed terminally reactive polyester urethanes, or by formulating a mixed batch by reacting both polyester units and polyether units with an isocyanate precursor to form a mixed oligomer, and then adding the reactive termini.

However, it is the functional backbones of the oligomer, rather than the end groups, that confer the excellent properties upon the compositions. Thus, systems analogous to the above-described acrylate- or methacrylate-based compositions, but bearing any reactive end groups, are equally suitable in meeting these requirements Thus, the acrylate or urethane may be replaced in-part, or by whole be replaced with various other exemplary end groups capable of reacting upon irradiation or other means, either by free radical initiation or cationic cure, to provide excellent performance coatings. Such end groups include free radical systems, such as thiolene systems (based on the reaction of multifunctional thiols and unsaturated polyenes, such as vinyl ethers; vinyl sulfides; allylic ethers; and bicyclic enes); amine-ene systems (based on the reaction of multifunctional amines and unsaturated polyenes); acetylenic systems; systems wherein the reactive portion of the component is internal rather than terminal; other vinylic (e.g., styrenic) systems; acrylamide systems; allylic systems; itaconate systems and crotonate systems; and cationic cure systems such as onium salt-induced vinyl ether systems and epoxy-terminated systems which react by ring-opening; and any others based on compounds possessing reactive termini as taught by U.S. Pat. No. 5,639,846 to Shustack, herein incorporated by reference in its entirety. In fact, virtually any end groups which cure by irradiation or other means but do not adversely effect the desirable properties (i.e., the oxidative, thermal and hydrolytic stability and the moisture resistance) of the cured composition are envisioned. Examples of compounds which may be used for the endcapping monomer include but are not limited to acrylates, methacrylates, vinyl ethers, vinyl sulfides, allyls, bicyclic enes, mercaptans, acetylenes, epoxides, amines, styrenes, acrylamides, and so forth. Suitable hydroxyl-terminated compounds which may be used as the endcapping monomer include but are not limited to hydroxyethyl acrylate; hydroxyethyl methacrylate; hydroxypropyl acrylate; hydroxypropyl methacrylate; hydroxybutyl acrylate; hydroxybutyl methacrylate; allyl ether; hydroxyethyl vinyl ether; hydroxypropyl vinyl ether; hydroxybutyl vinyl ether; hydroxyethyl mercaptan; hydroxypropyl mercaptan; hydroxyethyl-3-mercaptopropionate; and hydroxypropyl-3-mercaptopropionate.

A suitable base oligomer, then, is an aliphatic urethane oligomer having a polyester and/or a polyether backbone, such as an acrylated aliphatic urethane oligomer, containing 75 percent oligomer solids in a hexanediol diacrylate solvent. A suitable oligomer is 015-1516 from Eastman Chemical of Forest Park, Georgia, which comprises 75 percent by weight of an acrylated aliphatic urethane oligomer based on a polyester and a polyether in 25 percent by weight hexanediol diacrylate. Another suitable oligomer is PHOTOMER 6008, an acrylated aliphatic urethane oligomer based on a polyether, from Cognis of Ambler, Pennsylvania. Termini other than diacrylates may also be used, as specified for the primary or secondary coating. Other suitable examples of oligomers include PHOTOMER 6008 (aliphatic urethane acrylate), PHOTOMER 6019 (acrylated oligomer 51%, tripropylene glycol diacrylate 48.08%, hydroquinone 0.90% and acrylic acid 0.02%) each manufactured by Cognis; methacrylate ologomer from UCB of Smyrna, Georgia; E 10010 (polyether urethane diacrylate) from Sartomer of Exton, Pa.; 015-1516 (urethane acrylate oligomer 75%, 1,6 hexanediol diacrylate 25%) from Eastman Chemical; CN 969 (acrylate oligomer) from Sartomer; PHOTOMER 6010 (2-hydroxyethyl acrylate-4-4' methylene bis (cyclohexylisocyanate)-polytetramethylene glycol polymer 87%, trimethylolpropane polyethylene glycol ether triacrylate 13%) from Cognis and mixtures thereof.

The oligomer component comprises from about 10 percent to about 90 percent by weight, of the total weight of the above-described secondary coating composition, dry solids basis, the above percentages being based on the weight of oligomer only.

b. Hydrocarbonaceous Viscosity Adjusting Compound

A second component in the secondary coating may be a hydrocarbonaceous viscosity-adjusting compound (II) which is capable of reacting with the terminus of (I). One function of this compound is to adjust the viscosity of the coating to one which renders it easy to apply to buffer-coated fibers. The compound may be one which is hydrocarbon in nature so as to render it hydrophobic and to make it compatible with the rest of the system, and may contain a bicyclic structure so that it is shrinks minimally when cured.

Suitable such components include but are not limited to isobornyl acrylate; isobornyl methacrylate; $C_6$ to $C_{16}$ saturated hydrocarbon diol acrylates or methacrylates such as a mixture of $C_{14}$ and $C_{15}$ diol diacrylates or dimethacrylates, hexanediol diacrylate or hexanediol dimethacrylate; isobornyl vinyl ether; $C_6$ to $C_{16}$ saturated hydrocarbon diol vinyl ethers such as hexanediol divinyl ether or cyclohexane dimethanol divinyl ether; $C_6$ to $C_{16}$ saturated dithiols such as hexanedithiol, decanedithiol, and cyclohexane dimethanol dithiol; $C_6$ to $C_{16}$ saturated hydrocarbon terminal dioxides such as tetradecadiene dioxide; $C_6$ to $C_{16}$ saturated hydrocarbon terminal diglycidyl ethers such as hexanediol diglycidyl ether; or mixtures of these, so long the mixtures are coreactive but not adversely reactive with the oligomers used in the (I) component. A mixture of isobornyl acrylate and hexanediol diacrylate (the hexanediol diacrylate being provided as the reactive solvent for the oligomer) is a suitable constituent.

The second component is typically a monomer or mixtures of monomers. Suitable monomers include SR 238 (1,6 hexanediol diacrylate 99.09%, hydroquinone monomethyl ether 0.01%) from Sartomer; CD 614 (polypropylene glycol nonphenyl ether acrylate 99.50%, poly[oxy(methyl-1,2-ethanediyl)], α-(nonphenyl)-ω-hydroxy-0.50%); IBOA (exo-isobornyl acrylate) from UCB; SR 339 (2-phenoxyethyl acrylate 99.91%, hydroquinone monomethyl ether 0.09%) from Sartomer; HDODA (1,6 hexanediol diacrylate) from UCB; SR-339 (2-phenoxyethyl acrylate 99.91%, hydroquinone monomethyl ether 0.09%) from Sartomer; SR 349 (bisphenol A polyethylene glycol diether diacrylate 99.91%, hydroquinone monomethyl ether 0.09%) from Sartomer; TMPTA (trimethylolpropane triacrylate 99.9%, hydroquinone methylether 0.1%); and ARONIX M117 (polypropylene glycol nonphenyl ether acrylate 99%, toluene 1%) from ISC Specialty Chemicals, Inc. of Tarrytown, N.Y.

The component (II) comprises from about 20 percent to about 60 percent by weight of the composition, based on total weight of the (I), (II) and (III) components, dry solids basis.

c. Photoinitiator

As with the primary coating, a photoinitiator (III) is a potential component of the secondary coating but, in the case of free radical systems, may be required only when ultraviolet cure is to be used. Any of the acceptable photoinitiators disclosed as suitable for the primary coating are again suitable. Preferred photoinitiators are hydroxycyclohexylphenyl ketone and (4-octyloxyphenyl) phenyl iodonium hexafluoro antimonate. The photoinitiator may be added in an amount that is effective to initiate curing of the composition, and may comprise from about 0.05 percent to about 10 percent by weight, based on the total weight of (I), (II) and (III).

Suitable photoinitiators include IRGACURE 184 (1-hydroxycyclohexyl phenyl ketone) from Ciba Specialty Chemicals of Tarrytown, New York; CHIVACURE 184 (1-hydroxycyclohexyl phenyl ketone) from Chitec of Taipei, Taiwan; and mixtures thereof.

Generally, a lower level of photoinitiator is acceptable and perhaps desirable in the secondary coating relative to the primary coating, though this is not a requirement.

d. Optional Additives

As with the primary coating, various optional additives (IV) such as stabilizers may be incorporated, including but not limited to one or more of organic phosphites, hindered phenols, hindered amines, certain silanes, mixtures thereof, and the like. A typical stabilizer is thiodiethylene bis[3-(3, 5-di-tert-butyl-4-hydroxyphenyl)propionate] CAS #41484-35-9. When used, the stabilizer may be present in amounts of from about 0.1 percent to 3 percent by weight, based on the total weight of (I) oligomer, (II) monomer and (III) photoinitiator.

Suitable stabilizers include SILQUEST A-110 ((γ-aminopropyl) trimethoxysilane 98%, methanol 2%) from Crompton (OSI) of Palatine, Illinois; and IRGANOX 1035 (benzenepropanoic acid) from Ciba Specialty Chemicals.

Another optional additive for the secondary coating is a surface tension adjusting silicone additive, which may be used in embodiments where a secondary coating is to be applied atop a cured primary coating.

Suitable surface active agents include TEGO RAD 2200N (silicon polyether acrylate 98%, light aromatic solvent Naphtha (petroleum) 2%) from Tego Chemie of Essen, Germany; DC ADDITIVE 57 (siloxanes and silicones, di-methyl, 3-hydroxypropyl methyl, ethers with polyethylene glycol acetate 88%, polyethylene glycol monoallyl ether acetate 9%, poly(oxy-1,2-ethanediyl) α-acetyl-ω-(acetyloxy)-3%) from Dow Corning of Midland, Mich.; SILWET L-7602 (siloxanes and silicones, di-methyl, 3-hydroxy propyl methyl ethers with polyethylene glycol monomethyl ether 80%, polyoxyethylene allyl methyl ether 20%) from Crompton (OSI); BYK 371 (xylene 48%, acrylic-functional dimethylpolysiloxane 40%, ethylbenzene 12%) from BYK Chemie of Wesel, Germany; BYK 361 (acrylic co-polymer 98%, light aromatic solvent Naphtha (petroleum) 2%) from BYK Chemie; modified BYK371 (acrylic-functional dimethylpolysiloxane 70%, 1,6 hexanediol diacrylate 30%, xylene 1%); and mixtures thereof.

Also, a crosslinking agent may, optionally, be included in the secondary coating as well.

A chain transfer agent, such as 10 MPA (isoctyl 3-mercaptopropionate) manufactured by Hampshire of Nashua, N.H., may be included.

Finally, the secondary coating may include an adhesion promoter, such as SILANE A-172 (vinyltris(2-methoxyethoxy) silane 95%, polysiloxane 3.5% (impurity), 2-methoxyethanol 1.5%) from Crompton (OSI); SILANE A-189 ((γ-mercaptopropyl)trimethoxysilane 85%, (3-chloropropyl) trimethoxysilane 15%) from Crompton (OSI); as well as acrylated polysiloxanes, such as acrylated polysiloxane from Tego Chemie of Essen, Germany, and mixtures thereof.

One suitable secondary coating composition for coating an optical fiber, then, comprises the following:

(I) from about 40 percent to about 80 percent by weight of an acrylated aliphatic urethane oligomer based on a polyester and/or polyether; and (II) from about 25 percent to about 50 percent by weigh of a mixture of isobornyl acrylate and hexanediol diacrylate; and (III) from about 2.0 percent to about 7.0 percent by weight of hydroxycyclohexylphenyl ketone photoinitiator, wherein all of the stated percentages are by weight, based upon total weight of (I), (II) and (III).

This composition may also include from about 0.5 percent to about 1.5 percent by weight, based on the weight of the composition, of a stabilizer such as thiodiethylene bis (3,5-di-tert-butyl-4-hydroxy) hydrocinnamate. Also, in one embodiment, a crosslinking agent of the type and in the amount disclosed for the primary coating may be used. In embodiments, a surface tension adjusting additive may be included as well, and the oligomer component (I) may be a mixture of aliphatic urethane acrylate oligomers based on polyether backbones.

Because traditional techniques of filtering secondary coating compositions prior to application onto glass fiber do not prevent the occurrence of point lumps, the focus of the present invention is particularly directed to modified filtering conditions.

A typical secondary coating is formed as a combination of the following components, as described in U.S. Pat. No. 6,048,911 to Shustack et al., herein incorporated by reference, an aliphatic urethane acrylate;

hexanediol acrylate (HDODA);

a photoinitiator including IRGACURE 184 (1-hydroxycyclohexylphenyl ketone and an antioxidant including IRGANOX 1035 (a hindered polyphenol);

a silicone acrylate compatibility agent, such as BYK-371 a functionalized silicone compound, such as TEGO Rad-2100, TEGO Rad-2200; and optional conventional additives, as described above, such as thermal stabilizers, and the like, including, for example, organic phosphates, hindered phenols, hindered amines, and mixtures thereof. Other suitable secondary coating compositions include KLEARSHIELD 1-001, KLEARSHIELD 2-002, KLEARSHIELD 1-002, KLEARSHIELD 2-001, BONDSHEILD 5-001, BONDSHIELD 5-002, KLEARSHIELD 4-001, and DATASHIELD 6-002, available from Borden Chemical, Inc of Columbus, Ohio.

TABLE 1 presents a typical secondary coating (Coating A), with the individual components listed in weight percent:

TABLE I

| Component | %, by weight |
|---|---|
| Acrylic Monomer 1 | 15.66 |
| Acrylic Monomer 2 | |
| Initiator | 3.98 |
| Inhibitor | 0.99 |
| Acrylated Monomer | 13.89 |
| Acrylated Oligomer | 32.73 |
| Methacrylated Oligomer | 32.73 |
| Surfactant | 0.02 |

Coating A may be formulated through a series of steps, in the following manner. First, the photoinitiator, functionalized silicone, antioxidant, other additives and one-half of the acrylic monomer are mixed together in a clean, well ventilated tub for 1.5 hours. This mixture is held, while being continually mixed, for later use.

Next, 70% of the total acrylated oligomer is warmed to 140° F. to facilitate pumping into a kettle. The oligomer is slowly agitated, and maintained at a temperature less than or equal to 105° F.

The mixture from the first step is pumped into the oligomer in the kettle. The remainder of the oligomer is then added to the kettle. The resulting mixture is agitated at a faster rate as 30% of the acrylic monomer is added, and mixed for 30 minutes.

V. EXAMPLES

The following viscosities of TABLE II were determined with a Brookfield viscometer, using a No. SC4-34 spindle at a rotation speed of 6 rpm with a thermosel and sample cup, for a coating composition of Coating A (described above) at varying temperatures. The filter used was a Calyx Cartridge, WN grade, code 5, silicone filter, having a pore size of 0.45μ, such as Catalog No. WN04000A51, Material No. 1212686, available from Osmonics, Inc. of Minnetonka, Minn.

TABLE II

| Temperature (° C.) | Measured Viscosity (mPa) |
|---|---|
| 25 | 4879 |
| 30 | 3159 |
| 35 | 2110 |
| 40 | 1440 |
| 45 | 1030 |
| 50 | 725 |
| 55 | 550 |
| 60 | 415 |

Figure 11:
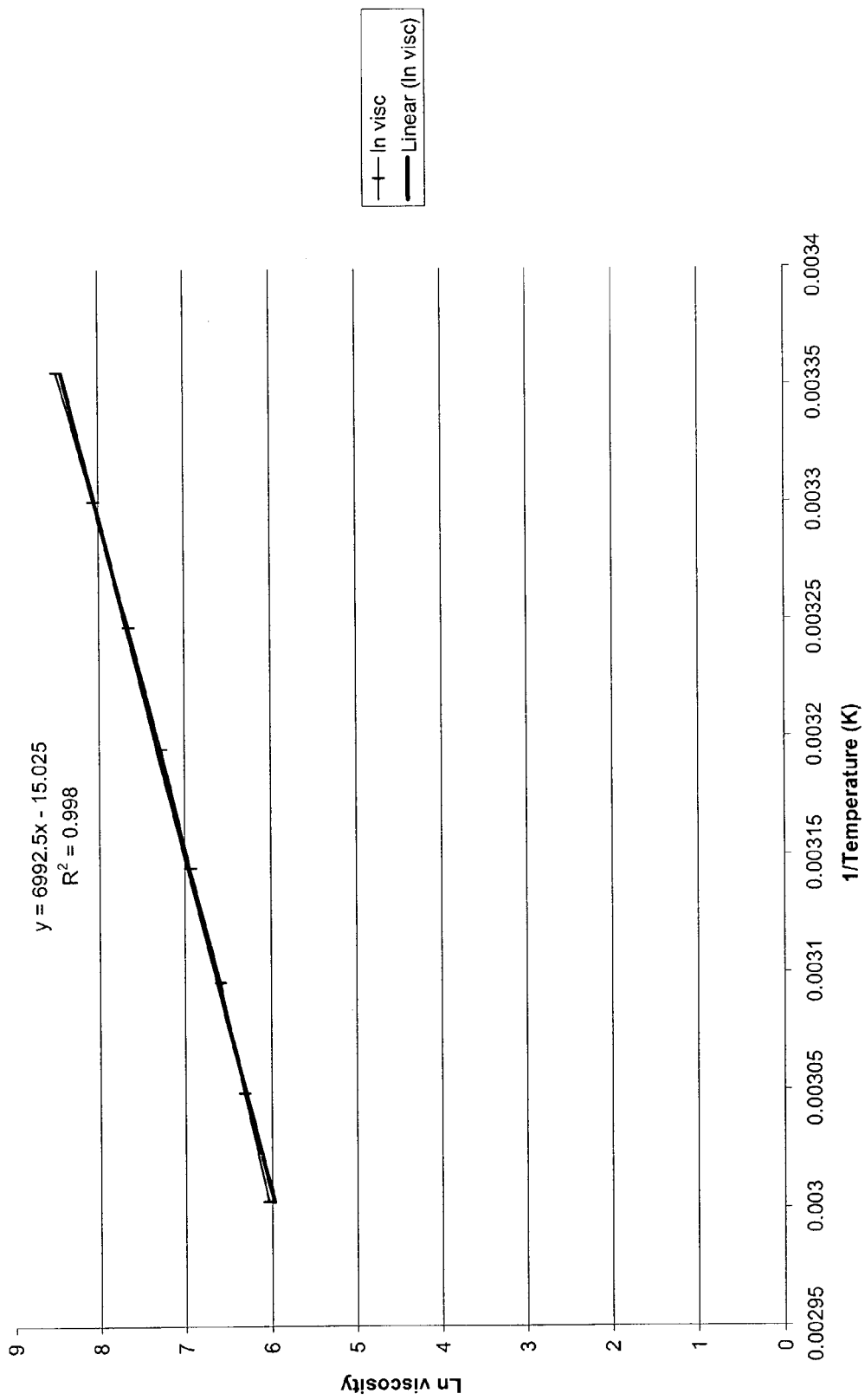
FIG. 11 is a graph showing the dependence of viscosity on temperature.

The above data is shown in FIG. 11 as a graph detailing the direct dependence of viscosity on temperature. Linear regression analysis of the data of TABLE II reveals the following Formula II:

$$Ln(\eta) = 6992.5(1/T) - 15.025 \quad (II)$$

wherein $\eta$ is viscosity measured in mPa·s and T is temperature measured in Kelvin (° C.+273). In addition, it must be noted that the linear regression produced an $R^2$ of 0.998. Therefore, for any given temperature, the following Formula III can be used to calculate the resulting viscosity:

$$\eta = e^{(6992.2/T) - 15.025} \quad (III)$$

where $\eta$ is viscosity measured in mPa·s and T is temperature measured in Kelvin. Although these observations and resulting calculations were determined using Coating A, as described above, the same viscosity measurements and calculations can be repeated with any practical coating composition. When the coating composition changes, the particular numbers shown in Formulae II and III will change, but the general relationship between the natural log of viscosity and temperature will remain.

When the filtration factor (γ), as described by the following general Formula I $$\frac{\Delta P (mPa)}{\eta (mPa \cdot s)} = \gamma (s^{-1}) \quad (I)$$

wherein $\eta$ is viscosity, and filtration factor (γ) is maintained less than or equal to 250,000 s$^{-1}$, maximum values for temperature and pressure differentials can be determined. TABLE III provides maximum temperatures for a number of pressure drops, at a filtration factor of 250,000 s$^{-1}$.

TABLE III

| Pressure Drop (psi) | Maximum Temperature (° C.) |
|---|---|
| 0.5 | 123.2 |
| 5 | 77.5 |
| 10 | 65.7 |
| 20 | 54.7 |
| 30 | 48.6 |
| 40 | 44.4 |
| 50 | 41.2 |
| 60 | 38.7 |
| 70 | 36.5 |
| 80 | 34.7 |
| 90 | 33.1 |
| 100 | 31.7 |

Figure 12:
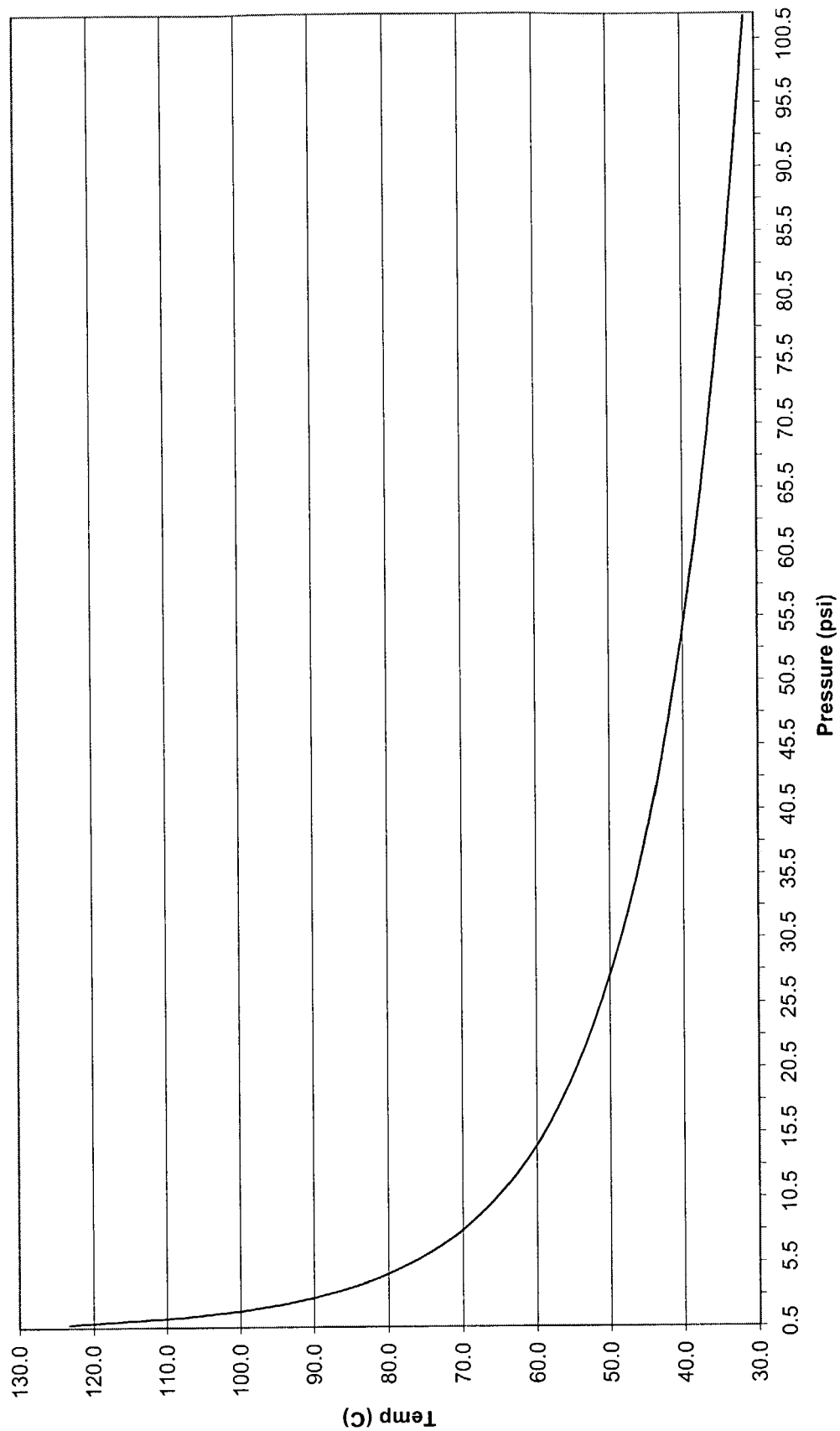
FIG. 12 is a graph showing the maximum temperature to be used at different pressure differentials in accordance with the invention.

This data is graphically represented in FIG. 12.

TABLE IV provides maximum pressure drops for a number of sample filtering temperatures, wherein the filtration factor is limited to the maximum of 250,000 s$^{-1}$.

TABLE IV

| Temperature (° C.) | Maximum Pressure Drop (psi) |
|---|---|
| 0 | 1438.7 |
| 5 | 907.6 |
| 10 | 582.0 |
| 20 | 250.4 |
| 30 | 113.9 |
| 40 | 54.5 |
| 50 | 27.3 |
| 60 | 14.2 |
| 70 | 7.7 |
| 80 | 4.3 |
| 90 | 2.5 |
| 100 | 1.5 |

Figure 13:
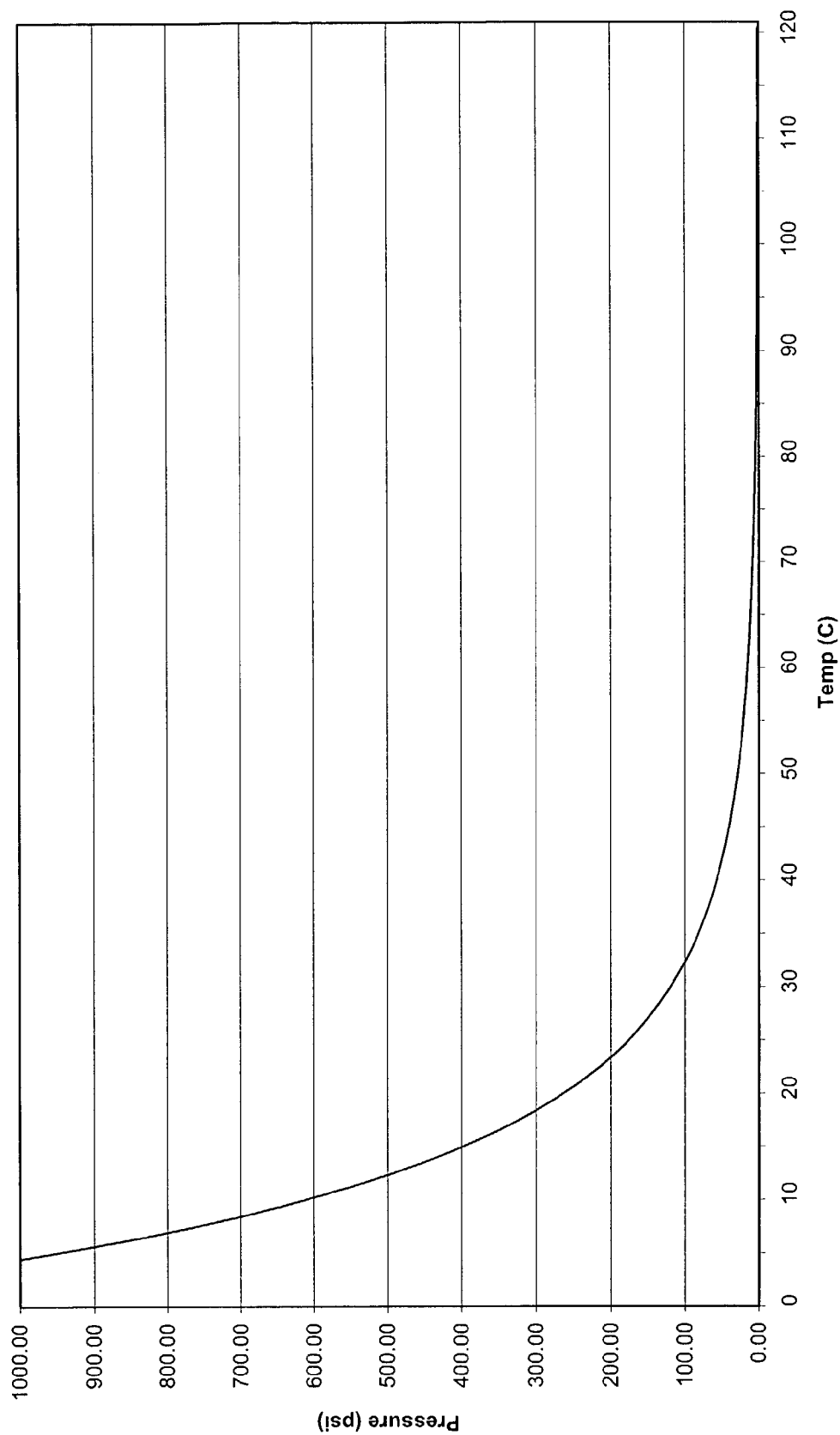
FIG. 13 is a graph showing the maximum pressure change with respect to temperature used in accordance with the invention.

This data is graphically represented in FIG. 13.

The above calculations are based on a maximum filtration factor of 250,000 s$^{-1}$, wherein $\Delta P/\eta = 250,000$ s$^{-1}$.

From the data in TABLE III, as well as Formulas I, II and III, the graphs of FIGS. 12 and 13 were generated. The plot shown in FIG. 12 shows the maximum $\Delta P$ for given filtering temperatures to achieve a filtration factor of 250,000 s$^{-1}$. In particular, the graph demonstrates that for a given temperature, any $\Delta P$ below the curve would result in a filtration factor less than or equal to 250,000 s$^{-1}$. The curve represents parameters to achieve a filtration factor of 250,000 s$^{-1}$, such that any $\Delta P$ below the curve would necessarily provide a suitable filtration factor. Furthermore, the curve demonstrates that as the filtering temperature increases, the respective maximum $\Delta P$ decreases. While not wishing to be limited by any theory, it is believed that at higher temperatures, the gel-like formations become more flexible and pliable, such that the forces caused by pressing the gels against the filter more easily tear the gels apart (or makes them more pliable to squeeze through the filter pores) and permit flow through the filter pores. Similarly, as the temperature decreases, the maximum pressure differential increases. Again, it is believed that this is caused by the less flexible and pliable nature of the gels at lower temperatures. Therefore, greater forces are required to rip apart or squeeze the gel formations at these lower temperatures.

The plot shown in FIG. 13 details how increasing filtering pressure differential influences the maximum filtering temperature, such that the filtration factor is capped at 250,000 s$^{-1}$. FIG. 13 shows that as $\Delta P$ increases, the maximum temperature decreases. As described with respect to FIG. 12, it is believed that because higher $\Delta P$s produce greater forces pressing against the gels, lower temperatures are required to prevent the forces from tearing the gels apart and forcing the gels through the filter pores. As long as the selected temperature is below the curve, the resulting filtration factor will be maintained at a level less than or equal to 250,000 s$^{-1}$. It must be noted that the pressure change listed on the X-axis is a total realized pressure change across the filter. Therefore, this figure takes into account the number of filters, whether parallel or in series and the surface area. If any factor is changed, such that the total realized pressure has changed, a different maximum temperature will result.

Following the procedure outlined above, the same calculations can be made for any coating composition. The general procedure is as follows:

1. Viscosity (η) is measured at varying temperatures (T) to determine their mathematical relationship, to complete the general Formula IV $$\ln(\eta) = a\left(\frac{1}{T}\right) + b \quad \text{(IV)}$$

wherein η is viscosity, measured in mPa·s, and T is temperature measured in Kelvin.

2. Once the values for a and b have been calculated by performing a linear regression analysis on the data from step 1, the relationship between viscosity and pressure drop (ΔP) can be determined such that any filtration factor is limited to a maximum of 250,000 s$^{-1}$. Specifically, using Formula III, the resulting filtration factor for varying viscosities (determined from filtering temperature) and pressure drop (ΔP) can be calculated.

3. An appropriate viscosity and pressure drop (ΔP) can then be selected, such that the filtration factor is maintained at a maximum of 250,000 s$^{-1}$, while also limiting various other filtering costs, such as energy used to generate elevated temperatures and pressure differentials and total filter flow.

Based upon the above general calculations for pressure drop, viscosity and temperature through a variety of filter media, the present inventors have determined formulae which can be used to maintain filtering to eliminate point lumps. Specifically, the following Formula V can be used to determine the maximum pressure drop (ΔP) across each filter media at a given temperature:

$$\Delta P_{max(psi)} = \frac{\gamma_{max(1/s)} \times \eta_{(mPa \cdot s)}}{6.894757_{(mPa/psi)}} \quad \text{(V)}$$

wherein η is the viscosity of the coating composition at the specific temperature and γ is the maximum preferred filtration factor. Therefore, when filtration factor is maintained at or below 250,000 s$^{-1}$, the maximum pressure drop (ΔP) is calculated according to the following Formula:

$$\Delta P_{max(psi)} = \frac{250000_{(1/s)} \times e^{\left\{\left(\frac{6992.5_{(mPa \cdot s \cdot K)}}{T_{(c)}+273}\right) - 15.025_{(mPa \cdot s)}\right\}}}{6.894757_{(mPa/psi)}} \quad \text{(VI)}$$

wherein T is the filtering temperature in degrees Celsius within the respective filter media.

By manipulating Formulas V and VI, the following general Formula VII was determined as a calculation of maximum filtering temperature to maintain a maximum filtration factor:

$$T_{max(c)} = \left\{\frac{6992.5_{(mPa \cdot s \cdot K)}}{\ln\left[\frac{\Delta P_{(psi)} \times 6.894757_{(mPa/psi)}}{\gamma_{max(1/s)}}\right] - 15.025_{(mPa \cdot s)}}\right\} - 273 \quad \text{(VII)}$$

wherein T is the resulting maximum filtering temperature at a pressure of ΔP at a maximum filtration factor of γ. However, the above Formulae I-VII can be used to select any filtration factor less than or equal to 250,000 s$^{-1}$.

The present inventors have determined that limiting the filtration factor to less than approximately 250,000 s$^{-1}$ in at least one filter media has produced coating compositions that resulting the number of point lumps being reduced or eliminated. The various filtering runs exemplified below demonstrate the advantages of a filtration factor cap of approximately 250,000 s$^{-1}$.

Typical coating compositions used in the filtering method of the invention, were filtered at a variety of temperatures and pressures, with their results detailed in TABLE V. For the Examples shown in TABLE V, the filter used was a 10 inch nylon, Calyx Cartridge, WN grade, code 5, silicone filter, having a pore size of 0.45μ, such as Catalog No. WN04000A51, Material No. 1212686, available from Osmonics, Inc. of Minnetonka, Minn.

TABLE V

| Coating | Temperature (° F.) | α Pressure (psig) | Filtration Factor (s$^{-1}$) | Result |
|---|---|---|---|---|
| B-1 | 105 | 60 | 284,802 | FAILURE |
| B-2 | 105 | 40 | 189,868 | SUCCESS |
| B-3 | 90 | 40 | 103,306 | SUCCESS |
| B-4 | 105 | 15 | 71,200 | SUCCESS |
| B-5 | 70 | 40 | 43,479 | SUCCESS |
| C-1 | 105 | 60 | 284,802 | FAILURE |
| C-2 | 90 | 60 | 154,726 | SUCCESS |
| C-3 | 90 | 40 | 103,306 | SUCCESS |

In TABLE V, the ΔP and filtration factor are for the overall filtration system.

For B-1, 60 psi the ΔP is for the overall filtration system having multiple filters in parallel within two housings in series. Thus, the ΔP in TABLE V is the pressure drop from the inlet of the first housing to the outlet of the second housing. However, the first housing has a pressure drop of 5 psi, the second housing has a pressure drop of 55 psi, and the pressure drop between the two housings was negligible.

For B-2, B-3 and B-5 at 40 psi the ΔP is for the overall filtration system having one filter housing containing multiple parallel filters. Thus the ΔP in TABLE V is the pressure drop from the inlet to the outlet of the one filter housing.

For B-4 the ΔP is for the overall filtration system having multiple filters in parallel within two housings in series. Thus the ΔP in TABLE V is the pressure drop from the inlet of the first housing to the outlet of the second housing, but the pressure drop in the first housing was zero and the pressure drop between the two housings was negligible.

For C-1 and C-2 at 60 psi the ΔP is overall for multiple filters in parallel within two housings in series. Thus the ΔP is the pressure drop from the inlet of the first housing to the outlet of the second housing. However, the first housing has a pressure drop of 5 psi and the second housing has a pressure drop of 55 psi and the pressure drop between the two housings was negligible.

For C-3 at 40 psi the ΔP is for the overall filtration system having one filter housing containing multiple parallel filters. Thus the ΔP in TABLE V is the pressure drop from the inlet to the outlet of the one filter housing.

In the examples of Table V, the results were determined by the rate of point lumps. As described above, in some circumstances, as many as an average of 5-10 point lumps per kilometer may be tolerable, indicated by SUCCESS, while others require an average number of point lumps per kilometer of between 0-5, while still further situations demand a complete elimination of point lumps, i.e., zero point lumps from the entire filtration product. Additionally, other examples have shown filtration factors of between approximately 50,000 and approximately 190,000 s$^{-1}$ result in coating compositions producing optical fibers with reduced or eliminated point lump frequencies in typical plant productions.

Coating B consisted of KLEARSHIELD 2-002, available from Borden Chemical, Inc. of Columbus, Ohio. Coating C consisted of KLEARSHIELD 2-001, available from Borden Chemical, Inc. of Columbus, Ohio. Each of Coating B and Coating C was made in accordance with the procedure described by U.S. Pat. No. 5,527,835 to Shustack.

Although described with reference to preferred embodiments, it should be readily understood that various changes and/or modifications could be made to the invention without departing from the spirit thereof. For example, it must be noted that the filtering of this invention may be performed at any stage of coating production, from raw material manufacture to application and curing on the draw tower. Thus, it is considered within the scope of the invention to filter the components prior to mixing together to form the secondary coating, as well as filtering all the components simultaneously after being mixed together just prior to use on the draw tower.

Additionally, any coating composition may be filtered with the filtering technique of the invention. While the invention has been described as being used to filter coatings for optical fibers, it is considered within the scope of the invention to filter any coating composition to be deposited on any surface where the elimination of point lumps is desired. Accordingly, the above-described filtering may be used during the manufacture of other objects, such as optical media, such as compact disks and DVDs, dental compositions, e.g., teeth, and laminated surfaces.

In any event, the invention is only intended to be limited by the scope of the following claims.

We claim:

1. A method for coating a substrate comprising:
providing a coating composition; filtering the coating composition by passing the coating composition through a filtering device comprising at least one filtering assembly comprising at least one filter, and applying the coating composition after filtering to the substrate;
wherein the at least one filtering assembly has a filtration factor ($\gamma$) determined by a Formula I $$\gamma(s^{-1}) = \frac{\Delta P(mPa)}{\eta(mPa \cdot s)} \quad \text{I}$$

of at most 250,000 s$^{-1}$, wherein $\eta$ is viscosity of the coating composition at the respective temperature of the coating composition within the respective filtering assembly, and $\Delta P$ is the pressure drop measured across the respective at least one filtering assembly and is between about 0 and about 80 psig, and the pore size of at least one filter of the at least one filtering assembly is at most 10 microns, and the respective temperature of the coating composition within the respective at least one filtering assembly is at most about 120° F.

2. The method of coating a substrate of claim 1, wherein the maximum pressure drop during said filtering is determined according a formula selected from the group consisting of:

$$\Delta P_{\max(psi)} = \frac{\gamma_{\max(1/s)} \times \eta_{(mPa \cdot s)}}{6.894757_{(mPa/psi)}}$$

and $$\Delta P_{\max(psi)} = \frac{250000_{(1/s)} \times e^{\left\{\left(\frac{6992.5_{(mPa \cdot s \cdot K)}}{T_{(c)}+273}\right) - 15.025_{(mPa \cdot s)}\right\}}}{6.894757_{(mPa/psi)}}$$

wherein $\eta$ is the viscosity of the coating composition at operating temperature T in the respective filtering assembly and $\gamma$ is the maximum predetermined filtration factor.

3. The method of coating a substrate of claim 1, wherein the maximum temperature during said filtering is determined according to the following formula:

$$T_{\max(c)} = \left\{\frac{6992.5_{(mPa \cdot s \cdot K)}}{\ln\left[\frac{\Delta P_{(psi)} \times 6.894757_{(mPa/psi)}}{\gamma_{\max(1/s)}}\right] - 15.025_{(mPa \cdot s)}}\right\} - 273$$

wherein $\Delta P$ is pressure drop across each respective filtering assembly and $\eta$ is viscosity of the coating composition at filtration temperature in the respective filtering assembly and $\gamma$ is the maximum predetermined filtration factor.

4. The method for coating a substrate of claim 1, wherein at least one of the at least one filtering assembly having a filtration factor of at most 250,000 s$^{-1}$ has a pore size in the range from approximately 0.05µ, to approximately 5µ, and wherein said filtering is performed at a temperature less than approximately 105° F. (40° C.), and at a pressure drop $\Delta P$ across the respective filtering assembly of at most approximately 80 psig.

5. The method of coating a substrate of claim 1, wherein the substrate is an optical fiber.

6. The method of coating a substrate of claim 5, wherein the coating composition is applied onto the optical fiber as a secondary coating; and further comprising the step of coating the optical fiber with a primary coating composition, wherein the secondary coating is applied over the primary coating.

7. The method of coating an substrate of claim 6, further comprising: curing the primary coating on the optical fiber; and thereafter curing the secondary coating on the optical fiber.

8. The method of coating a substrate of claim 6, wherein the curing of the first coating and curing the second coating occur simultaneously.

9. The method of coating a substrate of claim 1, wherein said filtering is performed at a temperature of approximately 60° F. and to approximately 95° F.

10. The method of coating a substrate of claim 1, wherein said filtering is performed at a temperature of approximately 70° F. to approximately 90° F.

11. The method of coating a substrate of claim 1, wherein said filtering is performed at a temperature of approximately 70° F. to approximately 80° F.

12. The method of coating a substrate of claim 1, wherein the at least one filtering assembly has a filtration factor less than or equal to approximately 43,000 s$^{-1}$.

13. The method of coating a substrate of claim 1, wherein the at least one filtering assembly has a filtration factor is between approximately 50,000 and 190,000 s$^{-1}$.

14. The method of coating a substrate of claim 1, wherein said pressure drop of said filtering is approximately 35 to approximately 55 psig.

15. The method of coating a substrate of claim 1, wherein said pressure drop of said filtering is approximately 40 to approximately 50 psig.

16. The method of coating a substrate of claim 1, wherein the at least one filtering assembly comprises a membrane filter having a pore size from approximately 0.05 to approximately 0.6 microns.

17. The method of coating a substrate of claim 1, wherein the at least one filtering assembly comprises a membrane filter having a pore size from approximately 0.1 to approximately 0.45 microns.

18. The method of coating a substrate of claim 1, wherein the at least one filtering assembly comprises a depth filter having a pore size of approximately 0.5 to approximately 5 microns.

19. The method of coating a substrate of claim 1, wherein the at least one filtering assembly comprises a depth filter having a pore size of approximately 1 to approximately 3 microns.

20. The method of coating a substrate of claim 1, wherein the substrate is a compact disk or a DVD.

21. The method of coating a substrate of claim 1, wherein the substrate is an optical medium.

22. The method of coating a substrate of claim 1, wherein the coating composition is a dental composition.

23. The method of coating a substrate of claim 1, wherein the substrate is a laminated surface.

24. The method of coating a substrate of claim 1, wherein the filtering device comprises a plurality of filtering assemblies arranged in series.

25. The method of coating a substrate of claim 1, wherein the filtering device comprises a plurality of filtering assemblies arranged in parallel.

26. The method of coating a substrate of claim 1, wherein each of the filtering assemblies have a filtration factor of at most 250,000 $s^{-1}$.

27. The method for coating a substrate according to claim 1, wherein at least one filter of the at least one filtering assembly has a pore size in the range from approximately 0.05 to approximately 5 microns, and said filtering is performed at a temperature less than approximately 105° F. (40° C.), and at a pressure drop $\Delta P$ at the at least one filtering assembly of at most approximately 80 psig.

28. The method for coating a substrate according to claim 1, wherein the pressure drop is in a range of approximately 3 to approximately 40 psi.

29. The method for coating a substrate according to claim 1, wherein the pore size of the filter is in a range from approximately 0.45 to 3 microns.

30. The method for coating a substrate according to claim 1, wherein the filtering temperature is in a range from approximately 70 to approximately 105° F.

\* \* \* \* \*